(12) United States Patent
Maliverney et al.

(10) Patent No.: US 9,512,294 B2
(45) Date of Patent: Dec. 6, 2016

(54) ORGANOPOLYSILOXANE COMPOSITION SUITABLE FOR VULCANISATION INTO AN ELASTOMER AT ROOM TEMPERATURE AND NEW ORGANOPOLYSILOXANE POLYCONDENSATION CATALYSTS

(71) Applicant: BLUESTAR SILICONES FRANCE SAS, Lyons (FR)

(72) Inventors: Christian Maliverney, Saint Julien sur Bibost (FR); Delphine Blanc, Lyons (FR); Delphine Platel, Saint Maurice de Gourdans (FR)

(73) Assignee: BLUESTAR SILICONES FRANCE SAS, Lyons (FR)

( * ) Notice: Subject to any disclaimer, the term of this patent is extended or adjusted under 35 U.S.C. 154(b) by 0 days.

(21) Appl. No.: 14/652,998

(22) PCT Filed: Dec. 17, 2013

(86) PCT No.: PCT/FR2013/000346
§ 371 (c)(1),
(2) Date: Jun. 17, 2015

(87) PCT Pub. No.: WO2014/096567
PCT Pub. Date: Jun. 26, 2014

(65) Prior Publication Data
US 2015/0322235 A1 Nov. 12, 2015

(30) Foreign Application Priority Data
Dec. 20, 2012 (FR) ..................... 12 03528

(51) Int. Cl.
| | | |
|---|---|---|
| C08K 3/36 | (2006.01) | |
| C08K 5/5415 | (2006.01) | |
| B05D 3/00 | (2006.01) | |
| C09D 183/04 | (2006.01) | |
| C08G 77/08 | (2006.01) | |
| C08G 77/14 | (2006.01) | |
| C08L 83/04 | (2006.01) | |
| B01J 31/04 | (2006.01) | |
| B01J 31/12 | (2006.01) | |

(52) U.S. Cl.
CPC .................. *C08K 3/36* (2013.01); *B01J 31/04* (2013.01); *B01J 31/122* (2013.01); *B05D 3/007* (2013.01); *C08G 77/08* (2013.01); *C08G 77/14* (2013.01); *C08K 5/5415* (2013.01); *C08L 83/04* (2013.01); *C09D 183/04* (2013.01); *B01J 2231/14* (2013.01); *Y02P 20/52* (2015.11)

(58) Field of Classification Search
None
See application file for complete search history.

(56) References Cited

U.S. PATENT DOCUMENTS

| | | | |
|---|---|---|---|
| 3,440,207 A | | 4/1969 | Nitzsche et al. |
| 4,410,677 A * | | 10/1983 | Lampe .................. C08K 5/098 524/265 |
| 4,515,932 A * | | 5/1985 | Chung .................. C08G 77/08 528/12 |
| 5,055,502 A * | | 10/1991 | Frances .................. C08G 77/18 524/780 |
| 6,245,952 B1 | | 6/2001 | Mimoun |
| 6,573,395 B2 * | | 6/2003 | Mimoun .............. B01J 31/1805 502/162 |
| 2007/0203297 A1 * | | 8/2007 | Wakabayashi ...... C08F 293/005 525/187 |
| 2008/0207938 A1 | | 8/2008 | Prasse |
| 2009/0092840 A1 * | | 4/2009 | Schlumpf .............. C08G 18/10 428/423.1 |
| 2010/0324213 A1 | | 12/2010 | Maliverney et al. |
| 2011/0046304 A1 | | 2/2011 | Maliverney |
| 2011/0206936 A1 * | | 8/2011 | Maliverney .......... B01J 31/0251 428/447 |
| 2011/0212333 A1 * | | 9/2011 | Maliverney ............. B08B 17/02 428/447 |
| 2011/0257286 A1 | | 10/2011 | Maliverney et al. |
| 2011/0287268 A1 * | | 11/2011 | Blanc ................... B01J 31/0237 428/447 |
| 2011/0305911 A1 * | | 12/2011 | Blanc ...................... A01N 55/00 428/447 |
| 2014/0343202 A1 * | | 11/2014 | Dinkar ................. B01J 31/2234 524/141 |
| 2014/0378612 A1 * | | 12/2014 | Dinkar .................... C08L 83/04 524/860 |

FOREIGN PATENT DOCUMENTS

| | | |
|---|---|---|
| EP | 147323 A2 | 7/1985 |
| EP | 235049 A1 | 9/1987 |
| FR | 2557582 A1 | 7/1985 |
| FR | 2786497 A1 | 6/2000 |

OTHER PUBLICATIONS

P. Oliver Dunstan "Thermochemistry of Adducts of Bis(2,4-pentanedionato)zinc with Heterocyclic Amines" J. Chem. Eng. Data 1999, 44, 243-247.*
International Search Report from corresponding PCT/FR2013/000346, mailed Apr. 29, 2014.
Noll, "Chemistry and Technology of Silicones", Chapter 8, Leverkusen, Germany, 1968, pp. 386-436.

* cited by examiner

*Primary Examiner* — Robert S Loewe
(74) *Attorney, Agent, or Firm* — McBee Moore Woodward Vanik IP LLC

(57) ABSTRACT

A composition comprising:
  at least one organosilicon compound A comprising at least two identical or different hydrolyzable and condensable groups, or at least two silanol functions =SiOH,
  at least one crosslinking agent B,
  optionally at least one filler C, and
  a catalytically effective amount of at least one polycondensation catalyst M which is a zinc complex comprising in its structure a first type of ligand that is a θ-diketonate and a second type of ligand that is an amine.

21 Claims, No Drawings

ORGANOPOLYSILOXANE COMPOSITION SUITABLE FOR VULCANISATION INTO AN ELASTOMER AT ROOM TEMPERATURE AND NEW ORGANOPOLYSILOXANE POLYCONDENSATION CATALYSTS

CROSS REFERENCE TO RELATED APPLICATIONS

This application is a §371 National Stage Application of PCT/FR2013/000346, filed 17 Dec. 2013, which claims priority to FR 12/03528, filed 20 Dec. 2012.

BACKGROUND

Field of the Invention

The present invention relates to a composition comprising at least one organosilicon compound A comprising at least two identical or different hydrolyzable and condensable groups, or at least two silanol functions ≡SiOH, which are crosslinkable, curable or vulcanizable at room temperature into elastomer by polycondensation and which do not contain any alkyltin-based catalysts that have toxicity problems.

Description of Related Art

SUMMARY

The invention also relates to novel polycondensation catalysts in the chemistry of silicon compounds and in particular in the chemistry of silicones and to the uses thereof as catalysts for the polycondensation reaction of silicon compounds comprising at least two identical or different hydrolyzable and condensable groups, or at least two silanol functions ≡SiOH.

Formulations of silicone compositions that crosslink via polycondensation generally involve a silicone oil, generally a polydimethylsiloxane, with hydroxyl end groups, optionally prefunctionalized with a silane so as to have hydrolyzable and condensable ends, a crosslinking agent, a polycondensation catalyst, conventionally a tin salt or an alkyl titanate, usually with a reinforcing filler and other optional additives such as bulking fillers, adhesion promoters, colorants, biocidal agents, etc.

These silicone compositions which "cure" by polymerization and/or crosslinking at room temperature are well known to those skilled in the art and are classified into two distinct groups:

one-pack compositions (RTV-1), which are in the form of only one part (or component) whose packaging is airtight, and two-pack compositions (RTV-2), which are in the form of two distinct parts (hence the name "two-pack") and whose packaging containing the catalyst is airtight.

The purpose of the airtight packagings is to avoid the silicone compositions containing the catalyst from coming into contact with atmospheric moisture during storage before use.

During curing (by polymerization and/or crosslinking) of these silicone compositions, the water is provided by the atmospheric moisture in the case of the RTV-1 products. In the case of the RTV-2 products, dimethyltin dicarboxylates are commonly used as catalysts, but they require the addition of an amount of water to one of the parts in order to activate the catalyst and to allow the polycondensation reaction when the contents of the two parts are mixed in ambient air so as to form the elastomer network, which is reflected by curing of the composition.

For example, the one-pack silicone compositions (RTV-1) used as mastics or adhesives crosslink without heating according to a mechanism involving a certain number of reactions that may be successive or simultaneous:

a) functionalization which results from the placing of a silicone oil bearing silanol functions in contact with a crosslinking agent, occasionally known as a "scavenger", such as a silane compound of $SiX_4$ type (for example a silicate) or a compound bearing the following function —$SiX_3$ with X usually being an alkoxy, acyloxy, amino, amido, enoxy, aminoxy, ketiminoxy or oxime function, which are well known for being reactive with silanol functions. The resulting product is usually known as a "functionalized oil". This reaction may be desired directly during the preparation of the composition or optionally as a pre-step before the addition of the other components of the composition. In this pre-step, it is common practice to use a functionalization catalyst, for instance lithium hydroxide or potassium hydroxide so as to give the one-pack composition good stability on storage. To do this, a person skilled in the art may choose specific functionalization catalysts and will adjust the amount of the reagents so as to have a molar excess of crosslinking agent relative to the silanol functions to be functionalized, and b) crosslinking via a hydrolysis of the functionalized oil generally performed by means of water vapor which diffuses into the material from the surface exposed to the atmosphere, and a condensation between the silanol groups formed and other residual reactive functions.

Generally, the polycondensation reaction kinetics are slow. These reactions are thus catalyzed with a suitable catalyst. As catalysts that are used, use is most often made of catalysts based on tin, titanium, an amine or compositions of these catalysts. Catalysts based on tin (cf. in particular FR-A-2 557 582) and on titanium (cf. in particular FR-A-2 786 497) are catalysts that are very effective.

As regards the RTV-2 two-pack compositions, they are sold and stored in the form of two components (or parts), a first component (or part) comprising the polymers that are capable of polycondensing and the second component is airtight and contains the catalyst and usually the crosslinking agent. The two components (or parts) are mixed during use and the mixture crosslinks in the form of a relatively hard elastomer when the composition comprises reinforcing fillers. These two-pack compositions are well known and are described, in particular, in the book by Walter Noll "Chemistry and Technology of Silicones" 1968, 2nd Edition, on pages 395 to 398. These compositions essentially comprise 4 different ingredients:

a reactive polymer such as an α,ω-bis(dimethylhydroxysilyl)polydimethylsiloxane, a crosslinking agent, a condensation catalyst, and optionally water, which is usually present when a dialkyltin dicarboxylate is used as catalyst (activation of this catalyst by the presence of water).

Usually, the condensation catalyst is based on an organic tin compound. Indeed, many tin-based catalysts have already been proposed as a catalyst for crosslinking these RTV-2 products. The most widely used compounds are alkyltin carboxylates such as tributyltin monooleate or dialkyltin dicarboxylates such as dibutyltin dilaurate, dibutyltin diacetate or dimethyltin dilaurate (see the book by Noll "Chemistry and Technology of silicones" page 337, Academic Press, 1968—2nd Edition or patents EP 147 323 or EP 235 049).

However, the alkyltin-based catalysts, although very effective, usually colorless, liquid and soluble in silicone oils, have the drawback of being toxic (CMR2 toxic for reproduction).

Titanium-based catalysts, which are also extensively used in RTV-1 products, have, however, a major drawback: they have slower kinetics than tin-based catalysts. Furthermore, these catalysts cannot be used in RTV-2 products due to gelling problems.

Other catalysts are sometimes mentioned, but they have only experienced minor industrial development due to their mediocre effectiveness. Among these catalysts, mention may be made of primary, secondary or tertiary organic amines, such as di-n-butylamine, diethylamine, etc. (see U.S. Pat. No. 3,440,207, column 5). These amines may be used alone or in combination with other catalysts. Thus, it may be seen that:
- in Example 9 (column 9), an amine used alone allows the curing of an RTV-1 composition within 3 hours of contact with atmospheric moisture, and
- in Example 2, an amine combined with a conventional catalyst such as dibutyltin dilaurate also allows the curing of an RTV-1 composition within 3 hours of contact with atmospheric moisture.

Patent application US 2008/0 207 938 describes (Example 1, page 6) the in-situ functionalization of an α,ω-bis(dimethylhydroxysilyl)polydimethylsiloxane oil, using a mixture of two catalysts: a [Zn(acac)$_2$.H$_2$O] complex and a large molar excess of dibutylamine in the absence of atmospheric moisture. The process thus describes the preparation of a silicone oil bearing alkoxylated groups, which are known to be stable on storage since they are formulated as an RTV-1 one-pack composition. When a silicone elastomer obtained by curing on contact with atmospheric moisture was prepared and described (Example 10), a tin catalyst was added to the composition. The problem associated with the use of a large molar excess of dibutylamine during the functionalization is the strong probability of observing migration of the dibutylamine to the surface of the silicone elastomer, thus forming fouling harmful to applications such as those requiring food contact or good adhesion to specific supports (aluminum, etc.).

For sustainable development, it therefore appears necessary to develop nontoxic catalysts for the polycondensation reaction of organopolysiloxanes.

Another important aspect for an organopolysiloxane polycondensation reaction catalyst is the pot life, that is to say the time during which the composition can be used after mixing without curing. This time must be long enough to allow it to be used, but short enough to obtain a molded article that can be handled at the latest a few minutes or a few hours after it has been manufactured. The catalyst must thus make it possible to obtain a good compromise between the pot life of the catalyzed mixture and the time at the end of which the molded article can be handled (these times depend on the targeted application such as, for example, the molding or manufacture of seals). In addition, the catalyst must confer, on the catalyzed mixture, a spreading time which does not vary as a function of the storage time.

DETAILED DESCRIPTION OF A PREFERRED EMBODIMENT

The essential objective of the present invention is therefore to find novel catalysts that enable, in atmospheric moisture, both surface crosslinking and core crosslinking that is as complete as possible when they are used in RTV-1 one-pack compositions.

Another essential objective of the present invention is to propose a catalyst that can be used both in the crosslinking of crosslinkable compositions into elastomer and which are in the form of a one-pack (RTV-1) or two-pack (RTV-2) composition.

Another essential objective of the present invention is to propose a catalytic system that continues simultaneously to meet the constraints of storage, of processing and of crosslinking of the two types of one-pack and two-pack elastomer compositions.

These objectives, among others, are achieved by the present invention, which relates firstly to a composition comprising:
- at least one organosilicon compound A comprising at least two identical or different hydrolyzable and condensable groups, or at least two silanol functions ≡SiOH,
- at least one crosslinking agent B,
- optionally at least one filler C, and
- a catalytically effective amount of at least one polycondensation catalyst M which is a zinc complex comprising in its structure a first type of ligand that is a β-diketonate and a second type of ligand that is an amine.

The term "β-diketonate" means the enolate anion of a β-dicarbonyl compound. In the present specification, the nomenclature used for describing the β-diketonate ligands in the chemical structures of the zinc complexes according to the invention is based on the corresponding β-diketone, which is the non-anionic form of the β-diketonate ligand before its complexation with the zinc atom (preparation via the action of a base). For example, in the following notation:
"[Zn(acac)$_2$ (n-propylamine)$_2$], with the ligand acac=2,4-pentanedione", it is understood that the zinc-complexing ligand is the corresponding pentanedionate anion:

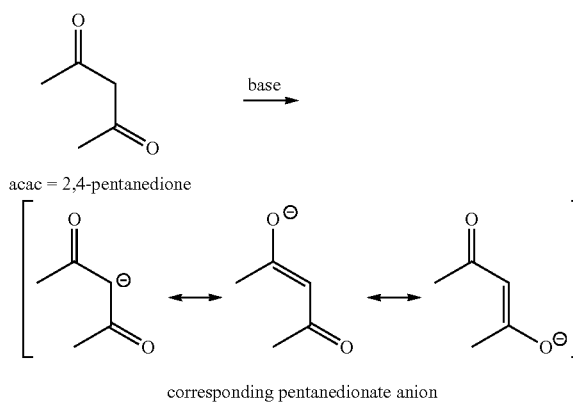

It is also understood that the term "complex" includes in its definition any monomeric, oligomeric or similar form of said zinc complex according to the invention.

Preferentially, the polycondensation catalyst M is a zinc complex comprising in its structure at least two β-diketonate ligands and at least one amine ligand, and even more preferentially, the polycondensation catalyst M is a zinc complex comprising in its structure:
- at least two identical or different β-diketonate (bis[β-diketonate]) ligands, and
- one to two amine ligands.

The inventors have, to their credit, found, entirely surprisingly and unexpectedly, that use should be made of zinc metal complexes comprising two specific types of ligands, namely β-dicarbonyl and amine ligands, to achieve crosslinking rates that are much more effective than those of zinc bis(β-diketonate) complexes, which, nevertheless, have structural similarities.

The inventors have also, to their credit, overcome the technical prejudice that hitherto maintained that certain complexes of metals, for instance zinc, have only mediocre activity in the polycondensation reaction of organopolysiloxanes.

The definition of the ligands is taken from the book "Chimie Organométallique" [Organometallic Chemistry] by Didier Astruc, published in 2000 by EDP Sciences: see, in particular, Chapter 1, "Les complexes monométalliques" [Single-metal complexes], pages 31 et seq.

The catalyst according to the invention may be in the solid or liquid state. It may be incorporated alone or in a suitable solvent. When it is in solvent, a silicone oil or any other compatible solvent such as petroleum fractions may be added, and the solvent is then evaporated so as to transfer the catalyst into a silicone medium. The mixture obtained may then serve as a "catalyzing base".

According to a preferred embodiment, the polycondensation catalyst(s) M may be obtained:

a) by reacting per 1 mol of at least one zinc complex of formula [Zn(β-diketonate)$_2$] or of a mixture of two different zinc complexes of formula [Zn(β-diketonate)$_2$]X$^1$ mol of amine or a mixture of amine, with X$^1$≤2.5 molar equivalents relative to the zinc, optionally in the presence of a solvent, so as to obtain a reaction product comprising:
  x mol of a zinc complex A which is a complex of formula [(Zn(β-diketonate)$_2$)$_r$(amine)]$_{z'}$,
  y mol of a zinc complex B which is a complex of formula [(Zn(β-diketonate)$_2$)$_r$(amine)$_2$]$_{z'}$,
  with x≥0, y≥1, the symbol r≥1 and preferably r=1, 2, 3 or 4, and the symbol z' is an integer greater than or equal to 1 and preferably z'=1, 2, 3 or 4,
  optionally X$^3$ mol of the complex [Zn(β-diketonate)$_2$], and
  optionally X$^4$ mol of residual unreacted amine, and b) after optionally removing the solvent and the residual amine, the polycondensation catalyst(s) M are recovered in the form of at least one zinc complex A, at least one zinc complex B or a mixture of zinc complex A and of zinc complex B, with optionally a residual amount of X$^3$ mol of the complex [Zn(β-diketonate)$_2$], and the symbols X$^1$, X$^3$ and X$^4$ are integers and the sum x+y+X$^3$=1.

The removal of the solvent and of the residual amine will be performed via any known technique (distillation, filtration, etc.). The preparation process takes care to remove any residual amine, so as to avoid any surface exudation of the amine when the elastomer is prepared by curing the composition on contact with atmospheric moisture. Removal of the solvent or of the residual amine will be performed via any known technique (distillation, filtration, etc.). It is known that [Zn(β-diketonate)$_2$(amine)] or [Zn(β-diketonate)$_2$(amine)$_2$] structures may also form dimers, trimers or tetramers. Consequently, the definition of the catalyst according to the invention also includes the dimeric, trimeric or tetrameric forms of said catalyst according to the invention.

Depending on the type of polycondensation catalyst M desired (monoamino or diamino zinc bis(β-diketonate) complex, or a mixture of these species), the number of moles of amine X$^1$ will be adjusted in consequence:

X$^1$≥2 molar equivalents relative to the zinc, and ≤2.5 molar equivalents relative to the zinc, so as predominantly to obtain a complex of formula [(Zn(β-diketonate)$_2$)$_r$(amine)$_2$]$_{z'}$, 1≤X$^1$<2 molar equivalents relative to the zinc, so as to obtain a mixture of complexes: [(Zn(β-diketonate)$_2$)$_r$(amine)]$_{z'}$ and [(Zn(β-diketonate)$_2$)$_r$(amine)$_2$]$_{z'}$, X$^1$<1 molar equivalent relative to the zinc, so as to obtain a mixture of complex [Zn(β-diketonate)$_2$(amine)] and of unreacted complex [Zn(β-diketonate)$_2$], with: the symbol r≥1 and preferably r=1, 2, 3 or 4, and the symbol z' is an integer greater than or equal to 1 and preferably the symbol z'=1, 2, 3 or 4, and even more preferentially z'=1 or 2.

Preferably, the number of moles of amine X1 added during the synthesis of the catalyst according to the invention will be ≤2.5 molar equivalents relative to the zinc to avoid the presence of an appreciable amount of free amine in the composition according to the invention. It is known that organic amines can migrate to the surface of the silicone elastomer, thus forming fouling, thus degrading the properties of the elastomer and at the same time contaminating the environment in the vicinity of the elastomer.

Complexes of the type [Zn(β-diketonate)$_2$] are for the most part commercially available or alternatively may be prepared according to a procedure described in international patent application WO 2009/106 718.

Preferably, the number of moles of amine X1 added during the synthesis of the catalyst according to the invention will be ≤2.5 molar equivalents relative to the zinc to avoid the presence of an appreciable amount of free amine in the medium and which would not be desirable for the stability of the composition according to the invention.

According to a preferred embodiment, the invention relates to a composition comprising:
  at least one organosilicon compound A comprising at least two identical or different hydrolyzable and condensable groups, or at least two silanol functions ≡SiOH,
  at least one crosslinking agent B,
  optionally at least one filler C, and
  a catalytically effective amount of at least one polycondensation catalyst M which is a complex of formula (1) below:

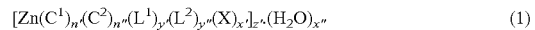

$$[Zn(C^1)_{n'}(C^2)_{n''}(L^1)_{y'}(L^2)_{y''}(X)_{x'}]_{z'}·(H_2O)_{x''} \qquad (1)$$

in which:
  the symbols C$^1$ and C$^2$ are identical or different ligands chosen from the group of β-diketonates,
  the symbols n' and n" are integers equal to 0, 1 or 2 with the condition that the sum n'+n"=2,
  the symbols L$^1$ and L$^2$ are identical or different ligands chosen from the group of amines,
  the symbols y' and y" represent the number of amine ligands and are integers equal to 0, 1 or 2 with the condition that the sum y'+y"=1 or 2,
  the symbol X is a ligand other than C$^1$, C$^2$, L$^1$ and L$^2$ and preferably a neutral ligand other than an amine and even more preferentially X is an H$_2$O molecule,
  the symbol x'≥0, and preferably x'=0, 1, 2, 3 or 4,
  the symbol x"≥0, and preferably x"=0, 1, 2, 3 or 4, and
  the symbol z' is an integer greater than or equal to 1 and preferably z'=1 or 2.

The ligand X is preferably a neutral ligand other than an amine, and the structure of which is of little importance. A person skilled in the art will use any type of precursor during the preparation of the catalyst M according to the invention such that this neutral ligand does not interfere with the reactivity of the catalyst. An example of a neutral ligand is, for example, a water molecule.

According to a preferred embodiment, the polycondensation catalyst M is a complex of formula (2) below:

in which:
the symbols $C^1$ and $C^2$ are identical or different ligands chosen from the group of β-diketonates,
the symbols n' and n" represent the number of β-diketonate ligands and are integers equal to 0, 1 or 2 with the condition that the sum n'+n"=2,
the symbols $L^1$ and $L^2$ are identical or different ligands chosen from the group of amines,
the symbols y' and y" represent the number of amine ligands and are integers equal to 0, 1 or 2 with the condition that the sum y'+y"=1 or 2, and
the symbol z' is an integer greater than or equal to 1 and preferably z'=1 or 2 and even more preferentially z'=1.

According to another preferred embodiment, the polycondensation catalyst M is a complex of formula (3) below:

in which:
the symbol C' is a ligand chosen from the group of β-diketonates,
the symbol L' is a ligand chosen from the group of amines,
the symbol y' is a number equal to 1 or 2,
the symbol r≥1 and preferably r=1, 2, 3 or 4, and
the symbol z' is an integer greater than or equal to 1 and preferably the symbol z'=1, 2, 3 or 4, and even more preferentially z'=1 or 2.

Examples of amines that are useful as ligands $L^1$ or $L^2$ are, for example, the following amidines: N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)morpholine, N-([alpha]-(decyliminoethyl)ethyl)pyrrolidine, N'-decyl-N,N-dimethylformamidine, N'-dodecyl-N,N-dimethylformamidine, N'-cyclohexyl-N,N-acetamidine.

Other amines that are useful as ligands are, for example, heterocyclic derivatives of imidazoline, imidazole, tetrahydropyrimidine, dihydropyrimidine, pyridine, pyrrolidine, piperidine or pyrimidine type. Use may also be made of acyclic amidines or guanidines.

Examples of imidazole ligands are the following compounds: N-(2-hydroxyethyl)imidazole, N-(3-aminopropyl)imidazole, 4-(hydroxymethyl)imidazole, 1-(tert-butoxycarbonyl)imidazole, 4-carboxyimidazole, 1-butylimidazole, 4-formylimidazole, 1-(ethoxycarbonyl)imidazole, 2-methylimidazole, 1-trimethylsilylimidazole, 1-(p-toluenesulfonyl)imidazole, 1,1'-carbonylbisimidazole and 1-(2-cyanoethyl)-2-ethyl-4-methylimidazole.

Examples of imidazoline ligands are the following compounds: 1H-imidazole-1-ethanol, 2-(8Z)-8-heptadecenyl-4,5-dihydro, 1H-imidazole-1-ethanol, 1H-imidazole-1-ethanol, 1H-imidazole, 4,5-dihydro, -2-(9Z)-9-octadecenyl, oleyl hydroxyethylimidazoline, 1H-imidazole-1-ethanol, 4,5-dihydro-2-undecyl-, 1H-imidazole-1-ethanol, 2-heptadecyl-4,5-dihydro et 1H-imidazole-1-ethanol, 2-nonyl-4,5-dihydro.

Preferably, the ligand of amine type $L^1$ or $L^2$ is chosen from the group consisting of primary monoamines of alkylamine type containing in total from 1 to 40 carbon atoms for the alkyl radical, secondary monoamines of dialkylamino type containing in total from 2 to 40 carbon atoms for the alkyl radicals, tertiary monoamines of trialkylamine type containing in total from 3 to 60 carbon atoms for the alkyl radicals, alkyl diamines containing in total from 1 to 40 carbon atoms for the alkyl radicals and amino silanes, and even more preferentially the ligands $L^1$ and $L^2$ are chosen from the group consisting of secondary monoamines of dialkylamino type containing in total from 2 to 20 carbon atoms and primary monoamines of alkylamine type containing in total from 1 to 40 carbon atoms for the alkyl radical.

Ligands of amine type $L^1$ or $L^2$ that are useful according to the invention are chosen from the group consisting of the following amines: N,N-dimethylethylenediamine, N,N'-dimethylethylenediamine, N,N,N'-trimethylethylenediamine, N,N'-diisopropylethylenediamine, n-butylamine, n-propylamine, n-heptylamine, n-octylamine, n-nonylamine, tert-butylamine, isopropylamine, 2-ethylhexylamine, decylamine, dodecylamine, which may be linear or branched, N-methyl-N-butylamine, N,N-dipropylamine, N,N-diisopropylamine, N-ethyl-N-butylamine, N,N-dibutylamine, N,N-dimethyl-N-butylamine, di(n-octyl)amine, N-n-propylethylenediamine, N,N,N',N'-tetramethylethylenediamine, 3-aminopropyltrimethoxysilane and 3-aminopropylmethyldiethoxysilane.

Another list of ligands that are useful according to the invention is the following list of amines:
Primary amines: N-propylamine, N-isopropylamine, N-butylamine, N-benzylamine, N-hexylamine, N-cyclohexylamine, N-n-octylamine, N-(2-ethylhexyl)amine, N-(2-phenylethyl)amine, N-(3-methoxypropyl)amine, N-nonylamine, N-isononylamine, N-decylamine, N-dodecylamine, ethylenediamine and 1,3-diaminopropane.
Secondary amines: N,N-dipropylamine, N,N-diisopropylamine, N,N-dibutylamine, N,N-dihexylamine, N,N-dicyclohexylamine, N,N-bis(2-methoxyethyl)amine, N,N-dioctylamine, N,N-bis(2-ethylhexyl)amine, N,N-diisononylamine, N,N-bis(tridecyl)amine, morpholine, piperidine, pyrrolidine, 2,2,6,6-tetramethylpiperidine, piperazine, N,N'-dimethylethylenediamine, N,N'-diethylethylenediamine and N,N'-diisopropylethylenediamine.

Examples of ligands $C^1$ and when the ligand $C^2$ is present are, for example, β-diketonates or enolate anions of a β-dicarbonyl compound of formula (4) below:

in which:
$R^1$ and $R^3$, independently of each other, represent a $C_1$ to $C_{30}$ hydrocarbon-based radical, a $C_6$ to $C_{30}$ hydrocarbon-based radical comprising an aromatic ring or a radical —$OR^4$ with $R^4$ which represents a $C_1$ to $C_{30}$ hydrocarbon-based radical,
$R^2$ is a hydrogen or a $C_1$ to $C_{30}$ hydrocarbon-based radical, with
$R^1$ and $R^2$ may be linked via a radical, preferably via a $C_3$ to $C_{30}$ hydrocarbon-based radical to form a ring, and
$R^2$ may be linked to $R^1$ or $R^3$ via a radical, preferably via a $C_3$ to $C_{30}$ hydrocarbon-based radical to form a ring.

According to a preferred embodiment, the ligands $C^1$ and when the ligand $C^2$ is present are 3-diketonates or enolate anions of a β-dicarbonyl compound of formula (5) below:

in which:
R$^1$ and R$^3$, independently of each other, represent a C$_1$ to C$_{30}$ hydrocarbon-based radical, a C$_6$ to C$_{30}$ hydrocarbon-based radical comprising an aromatic ring or a radical —OR$^4$ with R$^4$ which represents a C$_1$ to C$_{30}$ hydrocarbon-based radical, and R$^2$ is a hydrogen or a C$_1$ to C$_{30}$ hydrocarbon-based radical.

According to a preferred embodiment, the β-diketonate ligands C$^1$ and when the ligand C$^2$ is present are β-diketonates or enolate anions of a β-dicarbonyl compound chosen from the group consisting of the 3-diketones: 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; stearoylbenzoylmethane; octanoylbenzoylmethane; 4-t-butyl-4'-methoxydibenzoylmethane; 4,4'-dimethoxydibenzoylmethane and 4,4'-di-tert-butyldibenzoylmethane.

According to another preferred embodiment, the β-diketonate ligands C$^1$ and when the ligand C$^2$ is present are β-keto esterate anions chosen from the group consisting of anions derived from the following compounds: methyl, ethyl, n-propyl, isopropyl, n-butyl, sec-butyl, isobutyl, tert-butyl, isopentyl, n-hexyl, n-octyl, 1-methylheptyl, n-nonyl, n-decyl and n-dodecyl esters of acetylacetic acid.

According to another preferred embodiment, the polycondensation catalyst M is a complex of formula (6) below:

$$[(Zn(C^1)_2)_r(L^1)_{y'}]_{z'} \qquad (6)$$

in which:
the symbol y' is an integer equal to 1 or 2,
the symbol r≥1 and preferably r=1, 2, 3 or 4, and
the symbol z' is an integer greater than or equal to 1 and preferably the symbol z'=1, 2, 3 or 4, and even more preferentially z'=1 or 2,
the symbol L$^1$ is a ligand chosen from the group consisting of the following compounds:
N,N-dimethylethylenediamine, N,N'-dimethylethylenediamine, N-(n-propyl)ethylenediamine, N,N,N'-trimethylethylenediamine, N,N'-diisopropylethylenediamine, N,N-diethylethylenediamine, N,N'-diethylethylenediamine, N,N,N',N'-tetramethylethylenediamine, N-methylbutylamine, N-dibutylamine, n-propylamine, n-hexylamine, n-heptylamine, n-octylamine, n-nonylamine, n-decylamine, n-dodecylamine, tert-butylamine, isopropylamine, 2-ethylhexylamine, bis(2-ethylhexyl)amine, diisononylamine, N,N-dipropylamine, N,N-dihexylamine, N,N-diheptylamine, N,N-dioctylamine, N,N-diisopropylamine, N-ethyl-N-butylamine, N,N-dimethyl-N-butylamine, 3-aminopropyltrimethoxysilane and 3-aminopropylmethyldiethoxysilane, and
the symbol C$^1$ is chosen from the group consisting of the β-diketonates or the enolate anions of the following β-dicarbonyl compounds:
2,4-pentanedione; 2,4-hexanedione; 2,4-heptanedione; 2,4-octanedione; 2,4-nonanedione; 2,4-decanedione; 2,4-undecanedione; 2,4-dodecanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; stearoylbenzoylmethane; 4-t-butyl-4'-methoxydibenzoylmethane; 4,4'-dimethoxydibenzoylmethane, 4,4'-di-tert-butyldibenzoylmethane; 2,2,6,6-tetramethyl-3,5-heptanedione, ethyl acetoacetate and isopropyl acetoacetate, a β-diketone stearoylbenzoylmethane or 1-phenyl-3-eicosanedione of formula (7) below:

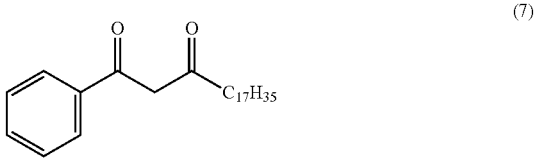

(7)

a β-diketone 2,2,7-trimethyl-3,5-octanedione of formula (8) below:

(8)

and the acetylacetic acid esters of formula (9) below:

CH$_3$COCH$_2$COOR  (9)

with R=methyl, ethyl, n-propyl, isopropyl, n-butyl, sec-butyl, isobutyl, tert-butyl, isopentyl, n-hexyl, n-octyl, methyl-1 heptyl, n-nonyl, n-decyl and n-dodecyl.

A polycondensation catalyst M that is particularly advantageous according to the invention is a complex chosen from the group consisting of the following complexes:
—[Zn(R50)$_2$(N,(n-propyl)ethylenediamine)],
—[Zn(R50)$_2$(N,(n-propyl)ethylenediamine)$_2$],
—[Zn(R50)$_2$(N,N-dimethylethylenediamine)],
—[Zn(R50)$_2$(N,N-dimethylethylenediamine)$_2$],
—[Zn(R50)$_2$(N,N'-dimethylethylenediamine)],
—[Zn(R50)$_2$(N,N'-dimethylethylenediamine)$_2$],
—[Zn(R50)$_2$(N,N,N'-trimethylethylenediamine)],
—[Zn(R50)$_2$(N,N,N'-trimethylethylenediamine)$_2$],
—[Zn(R50)$_2$(N,N'-diisopropylethylenediamine)],
—[Zn(R50)$_2$(N,N'-diisopropylethylenediamine)$_2$],
—[Zn(R50)$_2$(N,N-diethylethylenediamine)],
—[Zn(R50)$_2$(N,N-diethylethylenediamine)$_2$],
—[Zn(R50)$_2$(N-methylbutylamine)],
—[Zn(R50)$_2$(N-methylbutylamine)$_2$],
—[Zn(R50)$_2$(N-dibutylamine)],
—[Zn(R50)$_2$(N-dibutylamine)$_2$],
—[Zn(R50)$_2$(n-propylamine)],
—[Zn(R50)$_2$(n-propylamine)$_2$],
—[Zn(R50)$_2$(n-hexylamine)],
—[Zn(R50)$_2$(n-hexylamine)$_2$],
—[Zn(R50)$_2$(n-heptylamine)],
—[Zn(R50)$_2$(n-heptylamine)$_2$], —[Zn(R50)$_2$(n-octylamine)],
—[Zn(R50)$_2$(n-octylamine)$_2$],
—[Zn(R50)$_2$(n-nonylamine)],
—[Zn(R50)$_2$(n-nonylamine)$_2$],
—[Zn(R50)$_2$(n-decylamine)],
—[Zn(R50)$_2$(n-decylamine)$_2$],
—[Zn(R50)$_2$(n-dodecylamine)],
—[Zn(R50)$_2$(n-dodecylamine)$_2$],
—[Zn(R50)$_2$(N,N-dimethyl-N-butylamine)],
—[Zn(R50)$_2$(N,N-dimethyl-N-butylamine)$_2$],
—[Zn(R50)$_2$(N-ethyl-N-butylamine)],
—[Zn(R50)$_2$(N-ethyl-N-butylamine)$_2$],
—[Zn(R50)$_2$(N,N-diisopropylamine)],
—[Zn(R50)$_2$(N,N-diisopropylamine)$_2$],
—[Zn(R50)$_2$(N,N-dipropylamine)],
—[Zn(R50)$_2$(N,N-dipropylamine)$_2$],
—[Zn(TMOD)$_2$(N-(n-propyl)ethylenediamine)],
—[Zn(TMOD)$_2$(N-(n-propyl)ethylenediamine)$_2$],
—[Zn(TMOD)$_2$(N,N-dimethylethylenediamine)],
—[Zn(TMOD)$_2$(N,N-dimethylethylenediamine)$_2$],
—[Zn(TMOD)$_2$(N,N'-dimethylethylenediamine)],
—[Zn(TMOD)$_2$(N,N'-dimethylethylenediamine)$_2$],
—[Zn(TMOD)$_2$(N,N,N'-trimethylethylenediamine)],
—[Zn(TMOD)$_2$(N,N,N'-trimethylethylenediamine)$_2$],
—[Zn(TMOD)$_2$(N,N'-diisopropylethylenediamine)],
—[Zn(TMOD)$_2$(N,N'-diisopropylethylenediamine)$_2$],
—[Zn(TMOD)$_2$(N,N-diethylethylenediamine)],
—[Zn(TMOD)$_2$(N,N-diethylethylenediamine)$_2$],
—[Zn(TMOD)$_2$(N-methylbutylamine)],
—[Zn(TMOD)$_2$(N-methylbutylamine)$_2$],
—[Zn(TMOD)$_2$(N-dibutylamine)],
—[Zn(TMOD)$_2$(N-dibutylamine)$_2$],
—[Zn(TMOD)$_2$(n-propylamine)],
—[Zn(TMOD)$_2$(n-propylamine)$_2$],
—[Zn(TMOD)$_2$(n-hexylamine)],
—[Zn(TMOD)$_2$(n-hexylamine)$_2$],
—[Zn(TMOD)$_2$(n-heptylamine)],
—[Zn(TMOD)$_2$(n-heptylamine)$_2$],
—[Zn(TMOD)$_2$(n-octylamine)],
—[(Zn(TMOD)$_2$ n-octylamine)$_2$],
—[Zn(TMOD)$_2$(n-nonylamine)],
—[Zn(TMOD)$_2$(n-nonylamine)$_2$],
—[Zn(TMOD)$_2$(n-decylamine)],
—[Zn(TMOD)$_2$(n-decylamine)$_2$],
—[Zn(TMOD)$_2$(n-dodecylamine)],
—[Zn(TMOD)$_2$(n-dodecylamine)$_2$],
—[Zn(TMOD)$_2$(N,N-dimethyl-N-butylamine)],
—[Zn(TMOD)$_2$(N,N-dimethyl-N-butylamine)$_2$],
—[Zn(TMOD)$_2$(N-ethyl-N-butylamine)],
—[Zn(TMOD)$_2$(N-ethyl-N-butylamine)$_2$],
—[Zn(TMOD)$_2$(N,N-diisopropylamine)],
—[Zn(TMOD)$_2$(N,N-diisopropylamine)$_2$],
—[Zn(TMOD)$_2$(N,N-dipropylamine)],
—[Zn(TMOD)$_2$(N,N-dipropylamine)$_2$],
—[Zn(DPM)$_2$(N-(n-propyl)ethylenediamine)],
—[Zn(DPM)$_2$(N-(n-propyl)ethylenediamine)$_2$],
—[Zn(DPM)$_2$(N,N-dimethylethylenediamine)],
—[Zn(DPM)$_2$(N,N-dimethylethylenediamine)$_2$],
—[Zn(DPM)$_2$(N,N'-dimethylethylenediamine)],
—[Zn(DPM)$_2$(N,N'-dimethylethylenediamine)$_2$],
—[Zn(DPM)$_2$(N,N,N'-trimethylethylenediamine)],
—[Zn(DPM)$_2$(N,N,N'-trimethylethylenediamine)$_2$],
—[Zn(DPM)$_2$(N,N'-diisopropylethylenediamine)],
—[Zn(DPM)$_2$(N,N'-diisopropylethylenediamine)$_2$],
—[Zn(DPM)$_2$(N,N-diethylethylenediamine)],
—[Zn(DPM)$_2$(N,N-diethylethylenediamine)$_2$],
—[Zn(DPM)$_2$(N-methylbutylamine)],
—[Zn(DPM)$_2$(N-methylbutylamine)$_2$],
—[Zn(DPM)$_2$(N-dibutylamine)],
—[Zn(DPM)$_2$(N-dibutylamine)$_2$],
—[Zn(DPM)$_2$(n-propylamine)],
—[Zn(DPM)$_2$(n-propylamine)$_2$],
—[Zn(DPM)$_2$(n-hexylamine)],
—[Zn(DPM)$_2$(n-hexylamine)$_2$],
—[Zn(DPM)$_2$(n-heptylamine)],
—[Zn(DPM)$_2$(n-heptylamine)$_2$],
—[Zn(DPM)$_2$(n-octylamine)],
—[Zn(DPM)$_2$(n-octylamine)$_2$],
—[Zn(DPM)$_2$(n-nonylamine)],
—[Zn(DPM)$_2$(n-nonylamine)$_2$],
—[Zn(DPM)$_2$(n-decylamine)],
—[Zn(DPM)$_2$(n-decylamine)$_2$],
—[Zn(DPM)$_2$(n-dodecylamine)],
—[Zn(DPM)$_2$(n-dodecylamine)$_2$],
—[Zn(DPM)$_2$(N,N-dimethyl-N-butylamine)],
—[Zn(DPM)$_2$(N,N-dimethyl-N-butylamine)$_2$],
—[Zn(DPM)$_2$(N-ethyl-N-butylamine)],
—[Zn(DPM)$_2$(N-ethyl-N-butylamine)$_2$],
—[Zn(DPM)$_2$(N,N-diisopropylamine)],
—[Zn(DPM)$_2$(N,N-diisopropylamine)$_2$],
—[Zn(DPM)$_2$(N,N-dipropylamine)],
—[Zn(DPM)$_2$(N,N-dipropylamine)$_2$],
—[Zn(acac)$_2$(N,(n-propyl)ethylenediamine)],
—[Zn(acac)$_2$(N,(n-propyl)ethylenediamine)$_2$],
—[Zn(acac)$_2$(N,N-dimethylethylenediamine)],
—[Zn(acac)$_2$(N,N-dimethylethylenediamine)$_2$],
—[Zn(acac)$_2$(N,N'-dimethylethylenediamine)],
—[Zn(acac)$_2$(N,N'-dimethylethylenediamine)$_2$],
—[Zn(acac)$_2$(N,N,N'-trimethylethylenediamine)],
—[Zn(acac)$_2$(N,N,N'-trimethylethylenediamine)$_2$],
—[Zn(acac)$_2$(N,N'-diisopropylethylenediamine)],
—[Zn(acac)$_2$(N,N'-diisopropylethylenediamine)$_2$],
—[Zn(acac)$_2$(N,N-diethylethylenediamine)],
—[Zn(acac)$_2$(N,N-diethylethylenediamine)$_2$],
—[Zn(acac)$_2$(N-methylbutylamine)],
—[Zn(acac)$_2$(N-methylbutylamine)$_2$],
—[Zn(acac)$_2$(N-dibutylamine)],
—[Zn(acac)$_2$(N-dibutylamine)$_2$],
—[Zn(acac)$_2$(n-propylamine)],
—[Zn(acac)$_2$(n-propylamine)$_2$],
—[Zn(acac)$_2$(n-hexylamine)],
—[Zn(acac)$_2$(n-hexylamine)$_2$],
—[Zn(acac)$_2$(n-heptylamine)],
—[Zn(acac)$_2$(n-heptylamine)$_2$],
—[Zn(acac)$_2$(n-octylamine)],
—[Zn(acac)$_2$(n-octylamine)$_2$],
—[Zn(acac)$_2$(n-nonylamine)],
—[Zn(acac)$_2$(n-nonylamine)$_2$],
—[Zn(acac)$_2$(n-decylamine)],
—[Zn(acac)$_2$(n-decylamine)$_2$],
—[Zn(acac)$_2$(n-dodecylamine)],
—[Zn(acac)$_2$(n-dodecylamine)$_2$],
—[Zn(acac)$_2$(N,N-dimethyl-N-butylamine)],
—[Zn(acac)$_2$(N,N-dimethyl-N-butylamine)$_2$],
—[Zn(acac)$_2$(N-ethyl-N-butylamine)],
—[Zn(acac)$_2$(N-ethyl-N-butylamine)$_2$],
—[Zn(acac)$_2$(N,N-diisopropylamine)],
—[Zn(acac)$_2$(N,N-diisopropylamine)$_2$],
—[Zn(acac)$_2$(N,N-dipropylamine)],
—[Zn(acac)$_2$(N,N-dipropylamine)$_2$,
—[Zn(UDD)$_2$(N,(n-propyl)ethylenediamine)],
—[Zn(UDD)$_2$(N,(n-propyl)ethylenediamine)$_2$],
—[Zn(UDD)$_2$(N,N-dimethylethylenediamine)],
—[Zn(UDD)$_2$(N,N-dimethylethylenediamine)$_2$], —[Zn(UDD)₂(N,N'-dimethylethylenediamine)],
—[Zn(UDD)₂(N,N'-dimethylethylenediamine)₂],
—[Zn(UDD)₂(N,N,N'-trimethylethylenediamine)],
—[Zn(UDD)₂(N,N,N'-trimethylethylenediamine)₂],
—[Zn(UDD)₂(N,N'-diisopropylethylenediamine)],
—[Zn(UDD)₂(N,N'-diisopropylethylenediamine)₂],
—[Zn(UDD)₂(N,N-diethylethylenediamine)],
—[Zn(UDD)₂(N,N-diethylethylenediamine)₂],
—[Zn(UDD)₂(N-methylbutylamine)],
—[Zn(UDD)₂(N-methylbutylamine)₂],
—[Zn(UDD)₂(N-dibutylamine)],
—[Zn(UDD)₂(N-dibutylamine)₂],
—[Zn(UDD)₂(n-propylamine)],
—[Zn(UDD)₂(n-propylamine)₂],
—[Zn(UDD)₂(n-hexylamine)],
—[Zn(UDD)₂(n-hexylamine)₂],
—[Zn(UDD)₂(n-heptylamine)],
—[Zn(UDD)₂(n-heptylamine)₂],
—[Zn(UDD)₂(n-octylamine)],
—[Zn(UDD)₂(n-octylamine)₂],
—[Zn(UDD)₂(n-nonylamine)],
—[Zn(UDD)₂(n-nonylamine)₂],
—[Zn(UDD)₂(n-decylamine)],
—[Zn(UDD)₂(n-decylamine)₂],
—[Zn(UDD)₂(n-dodecylamine)],
—[Zn(UDD)₂(n-dodecylamine)₂],
—[Zn(UDD)₂(N,N-dimethyl-N-butylamine)],
—[Zn(UDD)₂(N,N-dimethyl-N-butylamine)₂],
—[Zn(UDD)₂(N-ethyl-N-butylamine)],
—[Zn(UDD)₂(N-ethyl-N-butylamine)₂],
—[Zn(UDD)₂(N,N-diisopropylamine)],
—[Zn(UDD)₂(N,N-diisopropylamine)₂],
—[Zn(UDD)₂(N,N-dipropylamine)],
—[Zn(UDD)₂(N,N-dipropylamine)₂], and with the ligand R50 which is the β-diketonate or the enolate anion of the following β-dicarbonyl compound=β-diketone stearoylbenzoylmethane of formula (7) below:

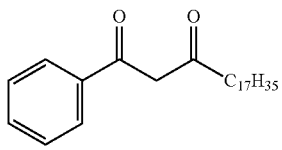

(7)

with the ligand acac which is the β-diketonate or the enolate anion of the following β-dicarbonyl compound=2,4-pentanedione with the ligand UDD which is the β-diketonate or the enolate anion of the following β-dicarbonyl compound=2,4-undecanedione with the ligand DPM which is the β-diketonate or the enolate anion of the following β-dicarbonyl compound=2,2,6,6-tetramethyl-3,5-heptanedione and with the ligand TMOD which is the β-diketonate or the enolate anion of the following β-dicarbonyl compound=2,2,7-trimethyl-3,5-octanedione of formula (8) below:

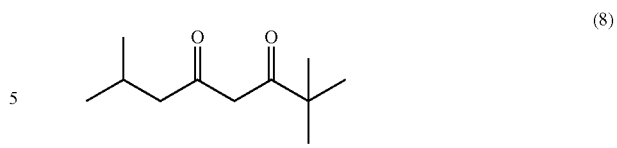

(8)

and mixtures thereof.

Preferably, the amount of polycondensation catalyst M according to the invention is between 0.1% and 10% by weight relative to the total weight of the composition, preferably between 0.5% and 5%, whether it is a one-pack or two-pack preparation.

According to a preferred embodiment, the composition according to the invention is free of tin-based catalyst, for instance tin dicarboxylates. This is made possible due to the good catalytic activity of the polycondensation catalyst M according to the invention.

The organosilicon compounds A according to the invention may be an organosilane, an organosiloxane, an organopolysiloxane comprising at least two hydrolyzable and condensable groups, or at least two silanol functions ≡SiOH, or mixtures of such organosilicon compounds.

Preferably, the organosilicon compound A according to the invention will bear at least two groups chosen from the group consisting of groups such as hydroxyl, alkoxy, alkoxy-alkylene-oxy, amino, amido, acylamino, aminoxy, iminoxy, ketiminoxy, acyloxy and enoxy.

According to one embodiment, the organosilicon compound A is a polyorganosiloxane comprising:
(i) at least two siloxyl units of formula (10) below:

(10)

in which:
the symbols $R^1$, which may be identical or different, represent $C_1$ to $C_{30}$ monovalent hydrocarbon-based radicals,
the symbols Z, which may be identical or different, each represent a hydrolyzable and condensable group or a hydroxyl group and are preferably chosen from the group consisting of groups of the following types: hydroxyl, alkoxy, alkoxy-alkylene-oxy, amino, amido, acylamino, aminoxy, iminoxy, ketiminoxy, acyloxy and enoxy,
a is equal to 0, 1 or 2, b is equal to 1, 2 or 3, the sum a+b is equal to 1, 2 or 3, and optionally (ii) one or more siloxyl units of formula (11) below:

(11)

in which:
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, and
the symbol c is equal to 0, 1, 2 or 3.

Another important aspect for a composition that is crosslinkable via condensation reactions is the working time (pot life), that is to say the time during which the composition may be used after mixing without curing. For example, in a molding application, this time must be long enough to allow it to be used, but short enough to obtain a molded article that can be handled at the latest a few minutes or a few hours after it has been manufactured. The catalyst must thus make it possible to obtain a good compromise between the pot life of the catalyzed mixture and the time at the end of which the molded article can be handled (these times depend on the targeted application such as, for example, the molding or manufacture of seals). In addition, the components that are reactive in the presence of the catalyst must confer, on the catalyzed mixture, a spreading time which does not vary as a function of the storage time.

Thus, when the organosilicon compound A is a polyorganosiloxane bearing at least two hydroxyl groups (of silanol type ≡SiOH), it has been discovered, surprisingly and unexpectedly, that when it is used in a composition according to the invention which comprises as catalyst a zinc complex bearing β-diketonate and amine ligands according to the invention, it is then possible to increase or decrease the "working time" (or pot life) by simply varying the molar mass of the organosilicon compound A within a specific range. Thus, by varying the weight-average molar masses ($M_w$) of the organosilicon compound A within a range of values greater than at least twice the entanglement molar mass $M_e$, it is then possible to modify the "working time" (or pot life) without deteriorating the mechanical properties (for example the shore A hardness) of the elastomer obtained after crosslinking. Without being bound by theory, the formation of points of entanglement starting from a certain length of macromolecular chains for each type of polyorganosiloxane is thus possible starting from a certain entanglement molar mass of the polymer identified by the symbol "$M_e$". Thus, the "critical molar mass" noted $M_c$ is defined as being equal to about twice the entanglement molar mass $M_e$. Above the critical molar mass $M_c$, it was thus possible to control the "working time" (or pot life) of the silicone composition before crosslinking.

As a guide and depending on the type of group present in the polyorganosiloxane bearing at least two hydroxyl groups of silanol type ≡SiOH, the entanglement molar mass $M_c$ is between 15 000 and 30 000 g/mol.

Thus, an advantageous embodiment consists in using an organosilicon compound A which is a polyorganosiloxane bearing at least two hydroxyl groups of silanol type ≡SiOH whose weight-average molar mass $M_w$ is greater than at least twice the entanglement molar mass $M_e$. Controlling, by virtue of the choice of the weight-average molar mass Mw of the organosilicon compound A, the presence or absence of entanglement of the polyorganosiloxane chains bearing at least two hydroxyl groups of silanol type ≡SiOH makes it possible simultaneously to control:
- the mechanical properties of the elastomer obtained after crosslinking of the composition according to the invention and especially the shore A hardness, and
- the "working time" during which the composition is manipulable before crosslinking.

Controlling the entanglement of the chains of the polyorganosiloxane bearing at least two hydroxyl groups of silanol type ≡SiOH will be performed by carefully selecting the weight-average molar mass $M_w$ of the polymer so that its molar mass is at least twice as large as the entanglement molar mass, i.e. it will be greater than the critical molar mass $M_c$ of this polymer.

Preferably, the organosilicon compound A is a polyorganosiloxane of general formula (13):

$$Z_1R_{3-n}Si\text{—}O\text{—}(SiR_2\text{—}O)_x\text{—}SiR_{3-n}Z_n \qquad (13)$$

in which:
the symbols Z, which may be identical or different, each represent a hydrolyzable and condensable group or a hydroxyl group and are preferably chosen from the group consisting of groups of the following types: hydroxyl, alkoxy, alkoxy-alkylene-oxy, amino, amido, acylamino, aminoxy, iminoxy, ketiminoxy, acyloxy and enoxy,
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups,
the symbol n is equal to 1, 2 or 3, preferably equal to 2 or 3 and when Z is a hydroxyl group, then n=1,
the symbol x is between 200 and 10000, preferably between 200 and 1000 and even more preferentially between 250 and 600.

In formulae (10), (11) and (13), the symbols $R^1$ and R are preferably:
alkyl radicals containing from 1 to 20 carbon atoms optionally substituted with: 1 or more aryl or
cycloalkyl groups, with one or more halogen atoms or with amino, ether, ester, epoxy, mercapto, cyano or (poly) glycol groups. Examples that may be mentioned include methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals,
cycloalkyl and halo cycloalkyl radicals containing from 5 to 13 carbon atoms, such as cyclopentyl, cyclohexyl, methylcyclohexyl, propylcyclohexyl, 2,3-difluorocyclobutyl and 3,4-difluoro-5-methylcycloheptyl radicals,
mononuclear aryl and haloaryl radicals containing from 6 to 13 carbon atoms, such as phenyl, tolyl, xylyl, chlorophenyl, dichlorophenyl or trichlorophenyl radicals, or
alkenyl radicals containing from 2 to 8 carbon atoms, such as vinyl, allyl or 2-butenyl radicals.

The dynamic viscosity of the organosilicon compound A is generally between 50 and 5 000 000 mPa·s at 25° C. and preferably between 100 and 1 000 000 mPa·s. It is specified that the viscosity values in the present specification are dynamic viscosity values measured at 25° C. using a Brookfield viscometer.

In the particular case where the organosilicon compound A is a polyorganosiloxane of general formula (13) with symbols Z of hydroxyl type, then the symbol n will preferably be equal to 1. In this case, it is preferred to use alpha,omega-dihydroxy polyorganosiloxanes which are generally oils whose dynamic viscosity usually ranges between 100 mPa·s at 25° C. and 1 000 000 mPa·s at 25° C., preferably from 800 mPa·s to 500 000 mPa·s at 25° C. When it is desired to control the service life of the bath, for example, in a molding application, it will be arranged such that the choice of the organosilicon compound A is made as a function of the weight-average molar mass $M_w$ ($M_w$ greater than at least twice the entanglement molar mass $M_e$). For a molding application and when the compound is a polydimethylsiloxane ending with silanol functions (≡SiOH), its viscosity will preferably be greater than 750 mPa·s and even more preferentially between 1000 mPa·s and 20 000 mPa·s.

When the organosilicon compound A is a polyorganosiloxane, it is advantageous to use those in which at least 60% of the radicals R and $R^1$ (in formulae 4 and 5) or of the radical R (in formula 6) are methyl radicals, the other radicals generally being phenyl and/or vinyl radicals.

According to the invention, the symbols Z each represent a hydroxyl group or a hydrolyzable and condensable group which are preferably chosen from the group consisting of groups of the following types: alkoxy, alkoxy-alkylene-oxy, amino, amido, acylamino, aminoxy, iminoxy, ketiminoxy, acyloxy and enoxy.

When the organosilicon compound A contains hydrolyzable and condensable groups Z according to the invention and is a polyorganosiloxane, it is usually described as a functionalized polymer and corresponds to a form that is stable in the absence of moisture which may be used in a one-pack composition and may thus be packaged in hermetically sealed cartridges, which will be opened by the operator during use to form, after curing, a cured elastomer. When the organosilicon group A contains groups Z of hydroxyl type, they may be functionalized in situ in the one-pack compositions, via a functionalization catalyst such as lithium hydroxide, so as to be able to store them and package them in hermetically sealed cartridges.

As examples of hydrolyzable and condensable groups Z of alkoxy type, mention may be made of groups containing from 1 to 8 carbon atoms, such as methoxy, ethoxy, n-propoxy, isopropoxy, n-butoxy, isobutoxy, sec-butoxy, tert-butoxy, 2-methoxyethoxy, hexyloxy or octyloxy groups.

As an example of hydrolyzable and condensable groups Z of alkoxy-alkylene-oxy type, mention may be made of the methoxy-ethylene-oxy group.

As examples of hydrolyzable and condensable groups Z of amino type, mention may be made of methylamino, dimethylamino, ethylamino, diethylamino, n-butylamino, sec-butylamino or cyclohexylamino groups.

As an example of hydrolyzable and condensable groups Z of amido type, mention may be made of the N-methylacetamido group.

As an example of hydrolyzable and condensable groups Z of acylamino type, mention may be made of the benzoylamino group.

As examples of hydrolyzable and condensable aminoxy groups Z, mention may be made of dimethylaminoxy, diethylaminoxy, dioctylaminoxy or diphenylaminoxy groups.

As examples of hydrolyzable and condensable groups Z of iminoxy and in particular ketiminoxy type, mention may be made of groups derived from the following oximes: acetophenone oxime, acetone oxime, benzophenone oxime, methylethylketoxime, diisopropylketoxime or methylisobutylketoxime.

As an example of hydrolyzable and condensable groups Z of enoxy type, mention may be made of the 2-propenoxy group.

The crosslinking agent B is preferably a silicon compound, each molecule of which comprises at least three hydrolyzable and condensable groups Y and said crosslinking agent B having formula (12) below:

$$R'_{(4-a)}SiY_a \qquad (12)$$

in which formula:
the symbol R' is a monovalent hydrocarbon-based radical comprising from 1 to 30 carbon atoms,
the symbol Y is an alkoxy, alkoxy-alkylene-oxy, amino, amido, acylamino, aminoxy, iminoxy, ketiminoxy, acyloxy or enoxy group and preferably Y is an alkoxy, acyloxy, enoxy, ketiminoxy or oxime group,
the symbol a=3 or 4.

Examples of groups Y are the same as those mentioned above when the symbol Z is a hydrolyzable and condensable group, i.e. other than a hydroxyl group.

As examples of crosslinking agent B, mention may be made of the alkoxysilanes of general formula (14) below, and the products of partial hydrolysis of this silane:

$$R^2_k Si(OR^3)_{(4-k)} \qquad (14)$$

in which:
the symbols $R^2$, which may be identical or different, represent alkyl radicals containing from 1 to 8 carbon atoms, such as methyl, ethyl, propyl, butyl, pentyl, 2-ethylhexyl radicals or $C_3$-$C_6$ oxyalkylene radicals,
the symbol $R^3$ represents a saturated or unsaturated, linear or branched aliphatic hydrocarbon-based group, a saturated or unsaturated and/or monocyclic or polycyclic aromatic carbocyclic group,
k is equal to 0, 1 or 2.

As examples of $C_3$-$C_6$ alkoxyalkylene radicals, mention may be made of the following radicals:
$CH_3OCH_2CH_2-$
$CH_3OCH_2CH(CH_3)-$
$CH_3OCH(CH_3)CH_2-$
$C_2H_5OCH_2CH_2CH_2-$ The symbol $R^3$ preferably represents a $C_1$-$C_{10}$ hydrocarbon-based radical that encompasses:
$C_1$-$C_{10}$ alkyl radicals such as methyl, ethyl, propyl, butyl, pentyl, 2-ethylhexyl, octyl or decyl radicals;
vinyl and allyl radicals; and
$C_5$-$C_8$ cycloalkyl radicals such as phenyl, tolyl and xylyl radicals.

These crosslinking agents B are products that are available on the silicones market; furthermore, their use in room-temperature curing compositions is known; it is featured especially in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Among the crosslinking agents B, preference is more particularly given to alkyltrialkoxysilanes, alkyl silicates and polyalkyl silicates, in which the organic radicals are alkyl radicals containing from 1 to 4 carbon atoms.

As other examples of crosslinking agents B that may be used, mention may be made more particularly of polyethyl silicate, poly(n-propyl silicate) and the following silanes: propyltrimethoxysilane, methyltrimethoxysilane, ethyltrimethoxysilane, vinyltriethoxysilane, vinyltrimethoxysilane, methyltriethoxysilane, propyltriethoxysilane, tetramethoxysilane, tetraethoxysilane, tetrapropoxysilane, tetrabutoxysilane 1,2-bis(trimethoxysilyl)ethane, 1,2-bis(triethoxysilyl)ethane, tetraisopropoxysilane, phenyltriethoxysilane, methyltris(methylethylketoximo)silane, 3-cyanopropyltrimethoxysilane, 3-cyanopropyltriethoxysilane, 3-(glycidyloxy)propyltriethoxysilane, vinyltris(methylethylketoximo)silane, tetrakis(methylethylketoximo)silane, acyloxysilanes such as vinyltriacetoxysilane, methyltriacetoxysilane or ethyltriacetoxysilane or alternatively those having the following formulae:
$CH_3Si(OCH_3)_3$; $C_2H_5Si(OC_2H_5)_3$; $C_2H_5Si(OCH_3)_3$
$CH_2=CHSi(OCH_3)_3$; $CH_2=CHSi(OCH_2CH_2OCH_3)_3$
$C_6H_5Si(OCH_3)_3$; $[CH_3][OCH(CH_3)CH_2OCH_3]Si[OCH_3]_2$
$Si(OCH_3)_4$; $Si(OC_2H_5)_4$; $Si(OCH_2CH_2CH_3)_4$;
$Si(OCH_2CH_2CH_2CH_3)_4$ Si(OC$_2$H$_4$OCH$_3$)$_4$; CH$_3$Si(OC$_2$H$_4$OCH$_3$)$_3$, CH$_2$Si(OC$_2$H$_5$)$_3$.

Use is generally made of 0.1 to 60 parts by weight of crosslinking agent B per 100 parts by weight of organosilicon compound A. Preferably, use is made of 1 to 15 parts by weight per 100 parts by weight of organosilicon compound A.

As fillers C, use may be made of mineral fillers that are very finely divided products with a mean particle diameter of less than 0.1 μm. The fillers C, preferably reinforcing silicas, are generally used in a proportion of from 1 to 150 parts and preferably from 8 to 100 parts per 100 parts of organosilicon compound A. They are chosen from combustion silicas and precipitation silicas. They have a specific surface area, measured according to the BET and CTAB methods, of at least 50 m$^2$/g and preferably greater than 70 m$^2$/g, a mean primary particle size of less than 80 nm and an apparent density of less than 200 g/liter. These silicas may be incorporated in unmodified form or after having been treated with organosilicon compounds usually used for this purpose. Among these compounds are methylpolysiloxanes such as hexamethyldisiloxane, octamethylcyclotetrasiloxane, methylpolysilazanes such as hexamethyldisilazane, hexamethylcyclotrisilazane, chlorosilanes such as dimethyldichlorosilane, trimethylchlorosilane, methylvinyldichlorosilane, dimethylvinylchlorosilane, alkoxysilanes such as dimethyldimethoxysilane, dimethylvinylethoxysilane, trimethylmethoxysilane.

In addition to or instead of the reinforcing silicas, semi-reinforcing or bulking mineral fillers may be added. These fillers are coarser and have a mean particle diameter of greater than 0.1 μm. These fillers are more especially represented by ground quartz, calcined clays, diatomaceous silicas, calcium carbonate, iron oxide, titanium oxide, magnesium oxide, aluminum oxide, zinc sulfate and barium sulfate. They are generally introduced in a proportion of from 1 to 120 parts by weight per 100 parts by weight of organosilicon compound A. These mineral fillers may be used in unmodified form, i.e. untreated, or treated with the organosilicon compounds mentioned above in the case of the reinforcing silicas.

The purpose of introducing fillers is to give good rheological properties to the composition before crosslinking and good mechanical properties to the elastomers that result from the curing of the compositions in accordance with the invention.

In combination with these fillers, use may be made of mineral and/or organic pigments and also agents that improve the thermal resistance (salts and oxides of rare-earth elements such as ceric oxides and hydroxides) and/or the fire resistance of the elastomers. For example, the oxide cocktails described in international application WO 98/29488 can be used. Among the agents that improve the fire resistance, mention may be made of halogenated organic derivatives, organophosphorus derivatives, platinum derivatives such as chloroplatinic acid (its products from reaction with alkanols, ether oxides), and platinous chloride-olefin complexes. These pigments and agents together represent at most 20% of the weight of the fillers.

The composition according to the invention may also comprise at least one adhesion promoter E, for instance organosilicon compounds bearing both:
(1) one or more hydrolyzable groups bonded to the silicon atom, and
(2) one or more organic groups substituted with radicals comprising a nitrogen atom or chosen from the group of (meth)acrylate, epoxy and alkenyl radicals, and more preferably still from the group constituted by the following compounds, taken alone or as a mixture:

vinyltrimethoxysilane (VTMO);
3-glycidoxypropyltrimethoxysilane (GLYMO);
methacryloxypropyltrimethoxysilane (MEMO);
[H$_2$N(CH$_2$)$_3$]Si(OCH$_2$CH$_2$CH$_3$)$_3$;
[H$_2$N(CH$_2$)$_3$]Si(OCH$_3$)$_3$;
[H$_2$N(CH$_2$)$_3$]Si(OC$_2$H$_5$)$_3$;
[H$_2$N(CH$_2$)$_4$]Si(OCH$_3$)$_3$;
[H$_2$NCH$_2$CH(CH$_3$)CH$_2$CH$_2$]SiCH$_3$(OCH$_3$)$_2$;
[H$_2$NCH$_2$]Si(OCH$_3$)$_3$;
[n-C$_4$H$_9$—HN—CH$_2$]Si(OCH$_3$)$_3$;
[H$_2$N(CH$_2$)$_2$NH(CH$_2$)$_3$]Si(OCH$_3$)$_3$;
[H$_2$N(CH$_2$)$_2$NH(CH$_2$)$_3$]Si(OCH$_2$CH$_2$OCH$_3$)$_3$;
[CH$_3$NH(CH$_2$)$_2$NH(CH$_2$)$_3$]Si(OCH$_3$)$_3$;
[H(NHCH$_2$CH$_2$)$_2$NH(CH$_2$)$_3$]Si(OCH$_3$)$_3$;

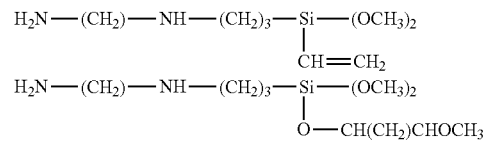

or polyorganosiloxane oligomers containing such organic groups in a content of greater than 20%.

Besides the main constituents, nonreactive linear polyorganosiloxane polymers (G) may be introduced with the intention of acting on the physical characteristics of the compositions in accordance with the invention and/or on the mechanical properties of the elastomers resulting from the curing of these compositions.

These nonreactive linear polyorganosiloxane polymers (G) are well known; they more especially comprise: α,ω-bis(triorganosiloxy)diorganopolysiloxane polymers with viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more precisely in French patents FR-A-978 058, FR-A-1 025 150, FR-A-1 108 764 and FR-A-1 370 884. Use is preferably made of α,ω-bis(trimethylsiloxy)dimethylpolysiloxane oils with a viscosity ranging from 10 mPa·s to 1000 mPa·s at 25° C. These polymers, which act as plasticizers, may be introduced in a proportion of at most 70 parts by weight, preferably of 5 to 20 parts by weight, per 100 parts by weight of the organosilicon compound A.

The compositions according to the invention may moreover advantageously comprise at least one silicone resin (H). These silicone resins are branched organopolysiloxane polymers which are well known and which are available commercially. They have, per molecule, at least two different units chosen from those of formula R'''$_3$SiO$_{12}$ (M unit), R'''$_2$SiO$_{2/2}$ (D unit), R'''SiO$_{3/2}$ (T unit) and SiO$_{4/2}$ (Q unit) with at least one of the units being a unit T or Q. The R''' radicals are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as examples of alkyl R radicals, of methyl, ethyl, isopropyl, tert-butyl and n-hexyl radicals. These resins are preferably hydroxylated and, in this case, have a weight content of hydroxyl group of between 5 and 500 meq./100 g. Examples of resins that may be mentioned include MQ resins, MDQ resins, TD resins and MDT resins.

Other customary auxiliary agents and additives may be incorporated into the composition according to the invention; these are chosen as a function of the applications in which said compositions are used.

The composition according to the invention may comprise the following amounts:
per 100 parts by weight of at least one organosilicon compound A comprising at least two identical or different hydrolyzable and condensable groups, or at least two silanol functions ≡SiOH,
from 0.1 to 60 parts by weight, preferably from 1 to 15 parts by weight, of at least one crosslinking agent B,
from 0 to 150 parts by weight of at least one filler C,
from 0 to 20 parts by weight of at least one adhesion promoter E,
from 0 to 150 parts by weight of at least one nonreactive linear polyorganosiloxane polymer G,
from 0 to 50 parts by weight of at least one silicone resin H, and
a catalytically effective amount of at least one polycondensation catalyst M according to the invention.

According to one variant of the invention, the composition according to the invention does not contain any catalyst containing in its structure at least one tin atom.

According to another variant of the invention, the polycondensation catalyst M is the only polycondensation catalyst present in said composition, which may optionally contain at least one functionalization catalyst.

Another subject of the invention relates to an RTV-2 two-pack composition, the precursor of the composition according to the invention and as described above, which is in two distinct packages P1 and P2, characterized in that:
the package P1, which is airtight, comprises:
a catalytically effective amount of at least one polycondensation catalyst M as defined above, and
at least one crosslinking agent B, and
the package P2 does not contain said polycondensation catalyst M and said crosslinking agent B and comprises:
per 100 parts by weight of at least one organosilicon compound A as defined above, and
from 0 to 10 part(s) by weight of water.

According to an advantageous variant of the invention, the package P1 and P2 do not contain any catalyst containing in its structure at least one tin atom.

According to an advantageous embodiment, it has been discovered that, in molding applications, and for an RTV-2 two-pack composition according to the invention comprising at least one catalyst according to the invention combined with an α,ω-dihydroxylated polydimethylsiloxane oil as organosilicon compound A, it is then possible to modify the lifetime of the bath, after mixing the contents P1 and P2 just before use, by simply varying the viscosity of the α,ω-dihydroxylated polydimethylsiloxane oil chosen while at the same time choosing an oil with a molecular mass $M_w$ greater than at least twice the critical entanglement molar mass $M_c$ of this polymer.

Thus, it has been discovered that by combining a catalyst according to the invention associated with at least one α,ω-dihydroxylated polydimethylsiloxane oil whose viscosity is between 2000 mPa·s and 5000 mPa·s, and preferably between 3000 and 4000 mPa·s, it is then possible to increase the lifetime of the bath when the parts P1 and P2 are combined just before use in a molding application, without deteriorating the hardness properties when the composition is hardened after crosslinking (Shore A hardness, SAH at 24 hours and at 4 days). Thus, according to a preferred embodiment, the invention relates to an RTV-2 two-pack composition for a molding application, the precursor of the composition as defined according to any one of claims 1 to 14, which is in two distinct packages P1 which is airtight and P2, characterized in that:
the package P1 comprises:
a catalytically effective amount of at least one polycondensation catalyst M according to the invention and as defined above, and
at least one crosslinking agent B preferably as defined above, and
the package P2 does not contain said polycondensation catalyst M and said crosslinking agent B and comprises:
per 100 parts by weight of at least one organosilicon compound A which is preferably a α,ω-bis(dimethylhydroxysilyl)polydimethylsiloxane whose dynamic viscosity at 25° C. is between 2000 mPa·s and 5000 mPa·s and preferably between 3000 mPa·s and 4000 mPa·s, and
from 0 to 10 part(s) by weight of water.

One of the advantages of these novel RTV-2 compositions according to the invention over conventional polycondensation RTV-2 products using dialkyltin dicarboxylate catalysts is that it is no longer necessary to add water to the part P2 since the catalyst according to the invention does not need to be activated, thus simplifying the formulation.

Another subject of the invention relates to an RTV-1 one-pack composition which is in a single airtight package P, comprising:
a) at least one organosilicon compound A comprising at least two identical or different hydrolyzable and condensable groups, or at least two silanol functions ≡SiOH,
b) at least one crosslinking agent B, and
c) a catalytically effective amount of at least one polycondensation catalyst M, and
d) optionally at least one filler C.

According to one variant of the invention, the RTV-1 one-pack composition according to the invention does not contain any catalyst containing in its structure at least one tin atom.

For the RTV-1 one-pack composition or RTV-2 two-pack composition, other components may be present, such as: the adhesion promoter E, the nonreactive linear polyorganosiloxane polymer G, the silicone resin H and the other additives as described in the present specification.

An RTV-2 two-pack composition is in two separate packages P1, which contains the catalyst and is airtight, and P2. They are packaged, after incorporation of the catalyst, in two separate fractions, one of the fractions possibly containing, for example, only the catalyst according to the invention or a mixture with the crosslinking agent. The manufacture of the RTV-2 two-pack compositions in accordance with the invention is also performed by mixing the various constituents in suitable equipment. RTV-2 two-pack compositions are described in detail, for example, in patents EP 118 325, EP 117 772, EP 10 478, EP 50 358, EP 184 966, U.S. Pat. No. 3,801,572 and U.S. Pat. No. 3,888,815 cited as reference.

An RTV-1 one-pack composition is in a single airtight package P that is stable on storage in the absence of moisture, which can be cured in the presence of moisture, in particular moisture provided by the ambient air or by water generated within the base during the use thereof. In order to manufacture the compositions according to the invention it is preferable, in the case of the one-pack compositions, to use equipment that makes it possible to intimately mix the various fundamental constituents in a moisture-free environment, with or without a supply of heat, optionally added to which constituents are the aforementioned adjuvants and additives. All these ingredients may be loaded into the equipment in any order of introduction. Thus, it is possible first to mix the organosilicon compound A and the fillers C and then to add to the slurry obtained the crosslinking agent B, and optionally the other components when they are present and finally the polycondensation catalyst M according to the invention. It is also possible to mix the organosilicon compound A, the crosslinking agent B, the filler C and optionally the other components and subsequently to add the polycondensation catalyst M according to the invention. During these operations, the mixtures may be heated to a temperature from 50° C. to 180° C. at atmospheric pressure or under a reduced pressure in order to promote the removal of volatile materials. The RTV-1 one-pack composition in accordance with the invention is used in unmodified form, i.e. undiluted, or in the form of dispersions in diluents, and is stable on storage in the absence of moisture or water and cure at low temperatures (after removal of the solvents in the case of dispersions) in the presence of water to form elastomers. RTV-1 one-pack compositions are described in detail, for example, in patents EP 141 685, EP 147 323, EP 102 268, EP 21 859, FR 2 121 289 and FR 2 121 631, cited as reference.

After the deposition in unmodified form of the compositions according to the invention, prepared from an RTV-1 one-pack composition, onto solid substrates, in a humid atmosphere, it is observed that a process of curing into elastomers occurs, it takes place from the outside to the inside of the mass deposited. A skin forms first at the surface, then the crosslinking continues in depth. The complete formation of the skin, which results in a tack-free feel of the surface, requires a period of time of a few minutes; this period of time depending on the degree of relative humidity of the atmosphere surrounding the compositions and on the crosslinkability of the latter.

Furthermore, the in-depth curing of the deposited layers, which must be sufficient to allow the demolding and handling of the elastomers formed, requires a longer period of time. Indeed, this period of time depends not only on the factors mentioned above for the formation of the tack-free feel but also on the thickness of the deposited layers, which thickness generally lies between 0.5 mm and several centimeters. The one-pack compositions may be used for multiple applications such as jointing in the construction industry, assembling the most diverse materials (metals, plastics, natural and synthetic rubbers, wood, board, earthenware, brick, ceramic, glass, stone, concrete, masonry units), insulating electrical conductors, the potting of electronic circuits, or the preparation of molds used for manufacturing articles made of synthetic resins or foams.

The compositions in accordance with the invention may be used for multiple applications such as jointing and/or bonding in the construction industry, in the transport industry (examples: motor vehicle, aerospace, railway, maritime and aeronautical), assembling the most diverse materials (metals, plastics, natural and synthetic rubbers, wood, cardboard, polycarbonate, earthenware, brick, ceramic, glass, stone, concrete, masonry units), insulating electrical conductors, the potting of electronic circuits, and the preparation of molds used for manufacturing articles made of synthetic resins or foams.

It is possible to add, to these one-pack bases, adhesion promoters E chosen, for example, from organosilicon compounds simultaneously bearing, on the one hand, organic groups substituted by radicals chosen from the group of amino, ureido, isocyanate, epoxy, alkenyl, isocyanurate, hydantoyl, guanidino and mercaptoester radicals and, on the other hand, hydrolyzable groups, in general alkoxy groups bonded to the silicon atoms. Examples of such adhesion agents are described in U.S. Pat. No. 3,517,001, U.S. Pat. No. 4,115,356, U.S. Pat. No. 4,180,642, U.S. Pat. No. 4,273,698, U.S. Pat. No. 4,356,116 and in European patents EP 31 996 and EP 74 001.

The compositions according to the invention are particularly useful for molding applications, in particular when they are in the RTV-2 two-pack form. For the use of the compositions according to the invention in this application, the techniques of casting or of application via a spatula or a brush or by spraying are useful.

Examples of molding techniques that may be mentioned include:
  "box moulding", which is intended for the manufacture of self-supporting molds, in one or more parts, by simple casting of the composition after mixing the two parts of the RTV-2 in liquid form on the initial master cast. This process is preferred for relatively simple forms without substantial reverse tapers;
  "molding in encasing in one or two parts", and
  "compression molding", which is preferred for making an imprint of inclined, vertical or overhanging master casts, generally of large size or when it is impossible to move the master cast.

Another subject of the invention relates to an elastomer obtained:
  after mixing the contents of the packages P1 and P2 of the RTV-2 two-pack composition according to the invention and as described above and leaving the mixture to cure,
  after placing in contact with atmospheric moisture the contents of the package P of the RTV-1 one-pack composition according to the invention and as described above and leaving said contents to cure, or
  after preparing the composition according to the invention and as described above and leaving the mixture to cure in the presence of water or of atmospheric moisture.

Another subject of the invention relates to a process for coating the composition according to the invention and as defined above onto a flexible support S which is made of textile, paper, polyvinyl chloride, polyester, polypropylene, polyamide; polyethylene; polyurethane or polyethylene terephthalate, comprising steps a), b) and c) below:
a) a composition according to the invention and as defined above is prepared,
b) said composition is then deposited in continuous or batch manner onto said flexible support S, and
c) said silicone composition X is left to crosslink in the presence of moisture provided by the ambient air or by prior addition of water so as to form a silicone elastomer.

The coating of silicone compositions according to the invention onto flexible supports targets numerous applications. For example, when the flexible support is a textile, water-repellency properties are sought, or, when the support is a paper or a polymer such as PVC, PET, etc., non-stick properties are usually sought.

Thus, once applied to a support, the silicone composition according to the invention crosslinks by means of the atmospheric moisture and/or by the presence of water in the composition to form a solid coating of silicone elastomer. In these liquid silicone coating compositions, the silicone phase may be diluted in a solvent.

According to one variant of the process according to the invention, the composition in step a) is prepared after mixing the contents of the packages P1 and P2 of the RTV-2 two-pack composition according to the invention and as defined above or using the contents of the package P of the RTV-1 one-pack composition according to the invention and as defined above.

The flexible supports S coated with a non-stick silicone film or with a non-stick silicone coat cured by crosslinking are chosen from the group consisting of supports made of textile, paper, polyvinyl chloride, polyester, polypropylene, polyamide; polyethylene; polyurethane or polyethylene terephthalate.

For the purposes of the invention, the term "textile" is a generic term including all textile structures. The textiles may consist of yarns, fibers, filaments and/or other materials. They especially comprise flexible fabrics, whether they are woven, bonded, knitted, plaited, felted, needled, sewn, or made via another manufacturing method.

These textiles may be openwork, i.e. they may comprise open spaces not comprising any textile. In order for the coating of the silicone composition of the invention to be efficient, it is preferable for the smallest of the dimensions of these open spaces to be less than 5 mm and especially less than 1 mm.

According to the invention, any type of flexible textile support S may be used. As a guide, mention may be made of:

natural textile fibers, such as: textiles of vegetable origin, such as cotton, flax, hemp, jute, coconut, paper cellulose fibers; and textiles of animal origin, such as wool, hairs, leather and silks;

artificial textiles, such as: cellulose-based textiles, such as cellulose or derivatives thereof; and protein-based textiles of animal or vegetable origin; and synthetic textiles, such as polyester, polyamide, polymalic alcohols, polyvinyl chloride, polyacrylonitrile, polyolefins, acrylonitrile, (meth)acrylate-butadiene-styrene copolymers and polyurethane.

The synthetic textiles obtained by polymerization or polycondensation may especially comprise in their matrices various types of additives, such as pigments, delustering agents, matt-effect agents, catalysts, heat and/or light stabilizers, antistatic agents, flame retardants, and antibacterial, antifungal and/or antiacarian agents.

As flexible textile types of support, mention may be made especially of supports obtained by rectilinear entanglement of yarns or fabrics, supports obtained by curvilinear interlacing of yarns or knits, mixtilinear surfaces or tulles, nonwoven supports and composite supports. Among the multitude of possible textile supports that may be used in the process of the invention, mention may be made of felts, denims, jacquard wovens, needled fabrics, sewn fabrics, crocheted fabrics, grenadines, laces and laceworks, damasks, webs, alpacas, baratheas, dimity fabrics, loop fabrics, brocades, calicos, velvets, canvasses, chiffons, flocked fabrics, sized fabrics, cheese-cloths, plaited fabrics, failles, foulard fabrics, gauzes, geotextiles, grandrelles, cushioned fabrics, tufted fabrics, organzas, pleated fabrics, ribbons and toiles.

The flexible textile support S used in the process of the present invention may consist of one or more identical or different textiles, assembled in various ways. The textile may be a monolayer or multilayer textile. The textile support may consist, for example, of a multilayer structure which may be made via various assembly means, such as mechanical means, for instance sewing, welding, or spot or continuous bonding.

The flexible textile support S may undergo, besides the coating process according to the present invention, one or more other subsequent treatments, also known as finishing or dry-filling treatments. These other treatments may be performed before, after and/or during said coating process of the invention. As other subsequent treatments, mention may be made especially of: dyeing, printing, back-bonding, coating, assembly with other materials or textile surfaces, washing, degreasing, preforming or fixing.

According to a preferred embodiment of the invention, the flexible textile support S is a lace or an elastic band.

The textiles thus obtained, in unmodified form or transformed into textile articles, may be used in numerous applications, for instance in the field of clothing, especially lingerie such as panty waistband or bra lacing, and hygiene articles, such as strapping tapes or dressings. These textile articles may be repositioned in various places of the body or of an item of clothing, for example by means of the adherence provided by the silicone elastomer.

In practice, the rate of deposition of the composition according to the invention onto the flexible support S is between 0.1 and 1 and preferably between 0.3 and 0.5 g/m$^2$, which corresponds to thicknesses of the order of a micrometer.

Another subject of the invention relates to the use of a polycondensation catalyst M according to the invention and as defined above as a catalyst for the polycondensation reaction of a silicon compound comprising at least two identical or different hydrolyzable and condensable groups, or at least two silanol functions ≡SiOH.

Finally, the last subject of the invention relates to complexes having the following formulae:

—[Zn(R50)$_2$(N,(n-propyl)ethylenediamine)],
—[Zn(R50)$_2$(N,(n-propyl)ethylenediamine)$_2$],
—[Zn(R50)$_2$(N,N-dimethylethylenediamine)],
—[Zn(R50)$_2$(N,N-dimethylethylenediamine)$_2$],
—[Zn(R50)$_2$(N,N'-dimethylethylenediamine)],
—[Zn(R50)$_2$(N,N'-dimethylethylenediamine)$_2$],
—[Zn(R50)$_2$(N,N,N'-trimethylethylenediamine)],
—[Zn(R50)$_2$(N,N,N'-trimethylethylenediamine)$_2$],
—[Zn(R50)$_2$(N,N'-diisopropylethylenediamine)],
—[Zn(R50)$_2$(N,N'-diisopropylethylenediamine)$_2$],
—[Zn(R50)$_2$(N,N-diethylethylenediamine)],
—[Zn(R50)$_2$(N,N-diethylethylenediamine)$_2$],
—[Zn(R50)$_2$(N-methylbutylamine)],
—[Zn(R50)$_2$(N-methylbutylamine)$_2$],
—[Zn(R50)$_2$(N-dibutylamine)],
—[Zn(R50)$_2$(N-dibutylamine)$_2$],
—[Zn(R50)$_2$(n-propylamine)],
—[Zn(R50)$_2$(n-propylamine)$_2$],
—[Zn(R50)$_2$(n-hexylamine)],
—[Zn(R50)$_2$(n-hexylamine)$_2$],
—[Zn(R50)$_2$(n-heptylamine)],
—[Zn(R50)$_2$(n-heptylamine)$_2$],
—[Zn(R50)$_2$(n-octylamine)],
—[Zn(R50)$_2$(n-octylamine)$_2$],
—[Zn(R50)$_2$(n-nonylamine)],
—[Zn(R50)$_2$(n-nonylamine)$_2$],
—[Zn(R50)$_2$(n-decylamine)], —[Zn(R50)₂(n-decylamine)₂],
—[Zn(R50)₂(n-dodecylamine)],
—[Zn(R50)₂(n-dodecylamine)₂],
—[Zn(R50)₂(N,N-dimethyl-N-butylamine)],
—[Zn(R50)₂(N,N-dimethyl-N-butylamine)₂],
—[Zn(R50)₂(N-ethyl-N-butylamine)],
—[Zn(R50)₂(N-ethyl-N-butylamine)₂],
—[Zn(R50)₂(N,N-diisopropylamine)],
—[Zn(R50)₂(N,N-diisopropylamine)₂],
—[Zn(R50)₂(N,N-dipropylamine)],
—[Zn(R50)₂(N,N-dipropylamine)₂],
—[Zn(TMOD)₂(N-(n-propyl)ethylenediamine)],
—[Zn(TMOD)₂(N-(n-propyl)ethylenediamine)₂],
—[Zn(TMOD)₂(N,N-dimethylethylenediamine)],
—[Zn(TMOD)₂(N,N-dimethylethylenediamine)₂],
—[Zn(TMOD)₂(N,N'-dimethylethylenediamine)],
—[Zn(TMOD)₂(N,N'-dimethylethylenediamine)₂],
—[Zn(TMOD)₂(N,N,N'-trimethylethylenediamine)],
—[Zn(TMOD)₂(N,N,N'-trimethylethylenediamine)₂],
—[Zn(TMOD)₂(N,N'-diisopropylethylenediamine)],
—[Zn(TMOD)₂(N,N'-diisopropylethylenediamine)₂],
—[Zn(TMOD)₂(N,N-diethylethylenediamine)],
—[Zn(TMOD)₂(N,N-diethylethylenediamine)₂],
—[Zn(TMOD)₂(N-methylbutylamine)],
—[Zn(TMOD)₂(N-methylbutylamine)₂],
—[Zn(TMOD)₂(N-dibutylamine)],
—[Zn(TMOD)₂(N-dibutylamine)₂],
—[Zn(TMOD)₂(n-propylamine)],
—[Zn(TMOD)₂(n-propylamine)₂],
—[Zn(TMOD)₂(n-hexylamine)],
—[Zn(TMOD)₂(n-hexylamine)₂],
—[Zn(TMOD)₂(n-heptylamine)],
—[Zn(TMOD)₂(n-heptylamine)₂],
—[Zn(TMOD)₂(n-octylamine)],
—[(Zn(TMOD)₂ n-octylamine)₂],
—[Zn(TMOD)₂(n-nonylamine)],
—[Zn(TMOD)₂(n-nonylamine)₂],
—[Zn(TMOD)₂(n-decylamine)],
—[Zn(TMOD)₂(n-decylamine)₂],
—[Zn(TMOD)₂(n-dodecylamine)],
—[Zn(TMOD)₂(n-dodecylamine)₂],
—[Zn(TMOD)₂(N,N-dimethyl-N-butylamine)],
—[Zn(TMOD)₂(N,N-dimethyl-N-butylamine)₂],
—[Zn(TMOD)₂(N-ethyl-N-butylamine)],
—[Zn(TMOD)₂(N-ethyl-N-butylamine)₂],
—[Zn(TMOD)₂(N,N-diisopropylamine)],
—[Zn(TMOD)₂(N,N-diisopropylamine)₂],
—[Zn(TMOD)₂(N,N-dipropylamine)],
—[Zn(TMOD)₂(N,N-dipropylamine)₂],
—[Zn(DPM)₂(N-(n-propyl)ethylenediamine)],
—[Zn(DPM)₂(N-(n-propyl)ethylenediamine)₂],
—[Zn(DPM)₂(N,N-dimethylethylenediamine)],
—[Zn(DPM)₂(N,N-dimethylethylenediamine)₂],
—[Zn(DPM)₂(N,N'-dimethylethylenediamine)],
—[Zn(DPM)₂(N,N'-dimethylethylenediamine)₂],
—[Zn(DPM)₂(N,N,N'-trimethylethylenediamine)],
—[Zn(DPM)₂(N,N,N'-trimethylethylenediamine)₂],
—[Zn(DPM)₂(N,N'-diisopropylethylenediamine)],
—[Zn(DPM)₂(N,N'-diisopropylethylenediamine)₂],
—[Zn(DPM)₂(N,N-diethylethylenediamine)],
—[Zn(DPM)₂(N,N-diethylethylenediamine)₂],
—[Zn(DPM)₂(N-methylbutylamine)],
—[Zn(DPM)₂(N-methylbutylamine)₂],
—[Zn(DPM)₂(N-dibutylamine)],
—[Zn(DPM)₂(N-dibutylamine)₂],
—[Zn(DPM)₂(n-propylamine)],
—[Zn(DPM)₂(n-propylamine)₂],
—[Zn(DPM)₂(n-hexylamine)],
—[Zn(DPM)₂(n-hexylamine)₂],
—[Zn(DPM)₂(n-heptylamine)],
—[Zn(DPM)₂(n-heptylamine)₂],
—[Zn(DPM)₂(n-octylamine)],
—[Zn(DPM)₂(n-octylamine)₂],
—[Zn(DPM)₂(n-nonylamine)],
—[Zn(DPM)₂(n-nonylamine)₂],
—[Zn(DPM)₂(n-decylamine)],
—[Zn(DPM)₂(n-decylamine)₂],
—[Zn(DPM)₂(n-dodecylamine)],
—[Zn(DPM)₂(n-dodecylamine)₂],
—[Zn(DPM)₂(N,N-dimethyl-N-butylamine)],
—[Zn(DPM)₂(N,N-dimethyl-N-butylamine)₂],
—[Zn(DPM)₂(N-ethyl-N-butylamine)],
—[Zn(DPM)₂(N-ethyl-N-butylamine)₂],
—[Zn(DPM)₂(N,N-diisopropylamine)],
—[Zn(DPM)₂(N,N-diisopropylamine)₂],
—[Zn(DPM)₂(N,N-dipropylamine)],
—[Zn(DPM)₂(N,N-dipropylamine)₂],
—[Zn(acac)₂(N,(n-propyl)ethylenediamine)],
—[Zn(acac)₂(N,(n-propyl)ethylenediamine)₂],
—[Zn(acac)₂(N,N-dimethylethylenediamine)],
—[Zn(acac)₂(N,N-dimethylethylenediamine)₂],
—[Zn(acac)₂(N,N'-dimethylethylenediamine)],
—[Zn(acac)₂(N,N'-dimethylethylenediamine)₂],
—[Zn(acac)₂(N,N,N'-trimethylethylenediamine)],
—[Zn(acac)₂(N,N,N'-trimethylethylenediamine)₂],
—[Zn(acac)₂(N,N'-diisopropylethylenediamine)],
—[Zn(acac)₂(N,N'-diisopropylethylenediamine)₂],
—[Zn(acac)₂(N,N-diethylethylenediamine)],
—[Zn(acac)₂(N,N-diethylethylenediamine)₂],
—[Zn(acac)₂(N-methylbutylamine)],
—[Zn(acac)₂(N-methylbutylamine)₂],
—[Zn(acac)₂(N-dibutylamine)],
—[Zn(acac)₂(N-dibutylamine)₂],
—[Zn(acac)₂(n-propylamine)],
—[Zn(acac)₂(n-propylamine)₂],
—[Zn(acac)₂(n-hexylamine)],
—[Zn(acac)₂(n-hexylamine)₂],
—[Zn(acac)₂(n-heptylamine)],
—[Zn(acac)₂(n-heptylamine)₂],
—[Zn(acac)₂(n-octylamine)],
—[Zn(acac)₂(n-octylamine)₂],
—[Zn(acac)₂(n-nonylamine)],
—[Zn(acac)₂(n-nonylamine)₂],
—[Zn(acac)₂(n-decylamine)],
—[Zn(acac)₂(n-decylamine)₂],
—[Zn(acac)₂(n-dodecylamine)],
—[Zn(acac)₂(n-dodecylamine)₂],
—[Zn(acac)₂(N,N-dimethyl-N-butylamine)],
—[Zn(acac)₂(N,N-dimethyl-N-butylamine)₂],
—[Zn(acac)₂(N-ethyl-N-butylamine)],
—[Zn(acac)₂(N-ethyl-N-butylamine)₂],
—[Zn(acac)₂(N,N-diisopropylamine)],
—[Zn(acac)₂(N,N-diisopropylamine)₂],
—[Zn(acac)₂(N,N-dipropylamine)],
—[Zn(acac)₂(N,N-dipropylamine)₂,
—[Zn(UDD)₂(N,(n-propyl)ethylenediamine)],
—[Zn(UDD)₂(N,(n-propyl)ethylenediamine)₂],
—[Zn(UDD)₂(N,N-dimethylethylenediamine)],
—[Zn(UDD)₂(N,N-dimethylethylenediamine)₂],
—[Zn(UDD)₂(N,N'-dimethylethylenediamine)],
—[Zn(UDD)₂(N,N'-dimethylethylenediamine)₂],
—[Zn(UDD)₂(N,N,N'-trimethylethylenediamine)],
—[Zn(UDD)₂(N,N,N'-trimethylethylenediamine)₂],
—[Zn(UDD)₂(N,N'-diisopropylethylenediamine)], —[Zn(UDD)$_2$(N,N'-diisopropylethylenediamine)$_2$],
—[Zn(UDD)$_2$(N,N-diethylethylenediamine)],
—[Zn(UDD)$_2$(N,N-diethylethylenediamine)$_2$],
—[Zn(UDD)$_2$(N-methylbutylamine)],
—[Zn(UDD)$_2$(N-methylbutylamine)$_2$],
—[Zn(UDD)$_2$(N-dibutylamine)],
—[Zn(UDD)$_2$(N-dibutylamine)$_2$],
—[Zn(UDD)$_2$(n-propylamine)],
—[Zn(UDD)$_2$(n-propylamine)$_2$],
—[Zn(UDD)$_2$(n-hexylamine)],
—[Zn(UDD)$_2$(n-hexylamine)$_2$],
—[Zn(UDD)$_2$(n-heptylamine)],
—[Zn(UDD)$_2$(n-heptylamine)$_2$],
—[Zn(UDD)$_2$(n-octylamine)],
—[Zn(UDD)$_2$(n-octylamine)$_2$],
—[Zn(UDD)$_2$(n-nonylamine)],
—[Zn(UDD)$_2$(n-nonylamine)$_2$],
—[Zn(UDD)$_2$(n-decylamine)],
—[Zn(UDD)$_2$(n-decylamine)$_2$],
—[Zn(UDD)$_2$(n-dodecylamine)],
—[Zn(UDD)$_2$(n-dodecylamine)$_2$],
—[Zn(UDD)$_2$(N,N-dimethyl-N-butylamine)],
—[Zn(UDD)$_2$(N,N-dimethyl-N-butylamine)$_2$],
—[Zn(UDD)$_2$(N-ethyl-N-butylamine)],
—[Zn(UDD)$_2$(N-ethyl-N-butylamine)$_2$],
—[Zn(UDD)$_2$(N,N-diisopropylamine)],
—[Zn(UDD)$_2$(N,N-diisopropylamine)$_2$],
—[Zn(UDD)$_2$(N,N-dipropylamine)],
—[Zn(UDD)$_2$(N,N-dipropylamine)$_2$], and with the ligand R50 which is the β-diketonate or the enolate anion of the following β-dicarbonyl compound=β-diketone stearoylbenzoylmethane of formula (7) below:

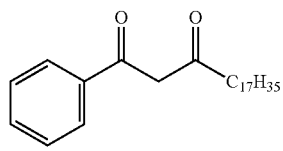

(7)

with the ligand acac which is the β-diketonate or the enolate anion of the following β-dicarbonyl compound=2,4-pentanedione with the ligand UDD which is the β-diketonate or the enolate anion of the following β-dicarbonyl compound=2,4-undecanedione with the ligand DPM which is the β-diketonate or the enolate anion of the following β-dicarbonyl compound=2,2,6,6-tetramethyl-3,5-heptanedione and with the ligand TMOD which is the β-diketonate or the enolate anion of the following β-dicarbonyl compound=2,2,7-trimethyl-3,5-octanedione of formula (8) below:

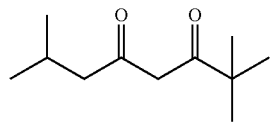

(8)

Other advantages and features of the present invention will appear on reading the following examples that are given by way of illustration and that are in no way limiting.

EXAMPLES

Example 1

Preparation of the [Zn(β-diketonate)$_2$(amine)$_n$] complexes

The [Zn(β-diketonate)$_2$] complexes are either commercially available or prepared according to the methods described in international patent application WO 2009/106 718.

General procedure for preparing the [Zn(β-diketonate)$_2$(amine)$_n$] complexes: A zinc diketonate is diluted or dissolved in an alkane, ether or aromatic solvent, and the amine is added in pure or diluted form, stoichiometrically, as a function of the desired complex. The complexation is slightly exothermic. The solvent is evaporated off to give the expected complex.

Depending on the β-diketonates, the nature of the amines and the amounts of amine added, the following complexes are obtained:
—[Zn(R50)$_2$(N,(n-propyl)ethylenediamine)],
—[Zn(R50)$_2$(N,(n-propyl)ethylenediamine)$_2$],
—[Zn(R50)$_2$(N,N-dimethylethylenediamine)],
—[Zn(R50)$_2$(N,N-dimethylethylenediamine)$_2$],
—[Zn(R50)$_2$(N,N'-dimethylethylenediamine)],
—[Zn(R50)$_2$(N,N'-dimethylethylenediamine)$_2$],
—[Zn(R50)$_2$(N,N,N'-trimethylethylenediamine)],
—[Zn(R50)$_2$(N,N,N'-trimethylethylenediamine)$_2$],
—[Zn(R50)$_2$(N,N'-diisopropylethylenediamine)],
—[Zn(R50)$_2$(N,N'-diisopropylethylenediamine)$_2$],
—[Zn(R50)$_2$(N,N-diethylethylenediamine)],
—[Zn(R50)$_2$(N,N-diethylethylenediamine)$_2$],
—[Zn(R50)$_2$(N-methylbutylamine)],
—[Zn(R50)$_2$(N-methylbutylamine)$_2$],
—[Zn(R50)$_2$(N-dibutylamine)],
—[Zn(R50)$_2$(N-dibutylamine)$_2$],
—[Zn(R50)$_2$(n-propylamine)],
—[Zn(R50)$_2$(n-propylamine)$_2$],
—[Zn(R50)$_2$(n-hexylamine)],
—[Zn(R50)$_2$(n-hexylamine)$_2$],
—[Zn(R50)$_2$(n-heptylamine)],
—[Zn(R50)$_2$(n-heptylamine)$_2$],
—[Zn(R50)$_2$(n-octylamine)],
—[Zn(R50)$_2$(n-octylamine)$_2$],
—[Zn(R50)$_2$(n-nonylamine)],
—[Zn(R50)$_2$(n-nonylamine)$_2$],
—[Zn(R50)$_2$(n-decylamine)],
—[Zn(R50)$_2$(n-decylamine)$_2$],
—[Zn(R50)$_2$(n-dodecylamine)],
—[Zn(R50)$_2$(n-dodecylamine)$_2$],
—[Zn(R50)$_2$(N,N-dimethyl-N-butylamine)],
—[Zn(R50)$_2$(N,N-dimethyl-N-butylamine)$_2$],
—[Zn(R50)$_2$(N-ethyl-N-butylamine)],
—[Zn(R50)$_2$(N-ethyl-N-butylamine)$_2$],
—[Zn(R50)$_2$(N,N-diisopropylamine)],
—[Zn(R50)$_2$(N,N-diisopropylamine)$_2$],
—[Zn(R50)$_2$(N,N-dipropylamine)],
—[Zn(R50)$_2$(N,N-dipropylamine)$_2$],
—[Zn(TMOD)$_2$(N-(n-propyl)ethylenediamine)],
—[Zn(TMOD)$_2$(N-(n-propyl)ethylenediamine)$_2$],
—[Zn(TMOD)$_2$(N,N-dimethylethylenediamine)],
—[Zn(TMOD)$_2$(N,N-dimethylethylenediamine)$_2$], —[Zn(TMOD)$_2$(N,N'-dimethylethylenediamine)],
—[Zn(TMOD)$_2$(N,N'-dimethylethylenediamine)$_2$],
—[Zn(TMOD)$_2$(N,N,N'-trimethylethylenediamine)],
—[Zn(TMOD)$_2$(N,N,N'-trimethylethylenediamine)$_2$],
—[Zn(TMOD)$_2$(N,N'-diisopropylethylenediamine)],
—[Zn(TMOD)$_2$(N,N'-diisopropylethylenediamine)$_2$],
—[Zn(TMOD)$_2$(N,N-diethylethylenediamine)],
—[Zn(TMOD)$_2$(N,N-diethylethylenediamine)$_2$],
—[Zn(TMOD)$_2$(N-methylbutylamine)],
—[Zn(TMOD)$_2$(N-methylbutylamine)$_2$],
—[Zn(TMOD)$_2$(N-dibutylamine)],
—[Zn(TMOD)$_2$(N-dibutylamine)$_2$],
—[Zn(TMOD)$_2$(n-propylamine)],
—[Zn(TMOD)$_2$(n-propylamine)$_2$],
—[Zn(TMOD)$_2$(n-hexylamine)],
—[Zn(TMOD)$_2$(n-hexylamine)$_2$],
—[Zn(TMOD)$_2$(n-heptylamine)],
—[Zn(TMOD)$_2$(n-heptylamine)$_2$],
—[Zn(TMOD)$_2$(n-octylamine)],
—[(Zn(TMOD)$_2$ n-octylamine)$_2$],
—[Zn(TMOD)$_2$(n-nonylamine)],
—[Zn(TMOD)$_2$(n-nonylamine)$_2$],
—[Zn(TMOD)$_2$(n-decylamine)],
—[Zn(TMOD)$_2$(n-decylamine)$_2$],
—[Zn(TMOD)$_2$(n-dodecylamine)],
—[Zn(TMOD)$_2$(n-dodecylamine)$_2$],
—[Zn(TMOD)$_2$(N,N-dimethyl-N-butylamine)],
—[Zn(TMOD)$_2$(N,N-dimethyl-N-butylamine)$_2$],
—[Zn(TMOD)$_2$(N-ethyl-N-butylamine)],
—[Zn(TMOD)$_2$(N-ethyl-N-butylamine)$_2$],
—[Zn(TMOD)$_2$(N,N-diisopropylamine)],
—[Zn(TMOD)$_2$(N,N-diisopropylamine)$_2$],
—[Zn(TMOD)$_2$(N,N-dipropylamine)],
—[Zn(TMOD)$_2$(N,N-dipropylamine)$_2$],
—[Zn(DPM)$_2$(N-(n-propyl)ethylenediamine)],
—[Zn(DPM)$_2$(N-(n-propyl)ethylenediamine)$_2$],
—[Zn(DPM)$_2$(N,N-dimethylethylenediamine)],
—[Zn(DPM)$_2$(N,N-dimethylethylenediamine)$_2$],
—[Zn(DPM)$_2$(N,N'-dimethylethylenediamine)],
—[Zn(DPM)$_2$(N,N'-dimethylethylenediamine)$_2$],
—[Zn(DPM)$_2$(N,N,N'-trimethylethylenediamine)],
—[Zn(DPM)$_2$(N,N,N'-trimethylethylenediamine)$_2$],
—[Zn(DPM)$_2$(N,N'-diisopropylethylenediamine)],
—[Zn(DPM)$_2$(N,N'-diisopropylethylenediamine)$_2$],
—[Zn(DPM)$_2$(N,N-diethylethylenediamine)],
—[Zn(DPM)$_2$(N,N-diethylethylenediamine)$_2$],
—[Zn(DPM)$_2$(N-methylbutylamine)],
—[Zn(DPM)$_2$(N-methylbutylamine)$_2$],
—[Zn(DPM)$_2$(N-dibutylamine)],
—[Zn(DPM)$_2$(N-dibutylamine)$_2$],
—[Zn(DPM)$_2$(n-propylamine)],
—[Zn(DPM)$_2$(n-propylamine)$_2$],
—[Zn(DPM)$_2$(n-hexylamine)],
—[Zn(DPM)$_2$(n-hexylamine)$_2$],
—[Zn(DPM)$_2$(n-heptylamine)],
—[Zn(DPM)$_2$(n-heptylamine)$_2$],
—[Zn(DPM)$_2$(n-octylamine)],
—[Zn(DPM)$_2$(n-octylamine)$_2$],
—[Zn(DPM)$_2$(n-nonylamine)],
—[Zn(DPM)$_2$(n-nonylamine)$_2$],
—[Zn(DPM)$_2$(n-decylamine)],
—[Zn(DPM)$_2$(n-decylamine)$_2$],
—[Zn(DPM)$_2$(n-dodecylamine)],
—[Zn(DPM)$_2$(n-dodecylamine)$_2$],
—[Zn(DPM)$_2$(N,N-dimethyl-N-butylamine)],
—[Zn(DPM)$_2$(N,N-dimethyl-N-butylamine)$_2$],
—[Zn(DPM)$_2$(N-ethyl-N-butylamine)],
—[Zn(DPM)$_2$(N-ethyl-N-butylamine)$_2$],
—[Zn(DPM)$_2$(N,N-diisopropylamine)],
—[Zn(DPM)$_2$(N,N-diisopropylamine)$_2$],
—[Zn(DPM)$_2$(N,N-dipropylamine)],
—[Zn(DPM)$_2$(N,N-dipropylamine)$_2$],
—[Zn(acac)$_2$(N,(n-propyl)ethylenediamine)],
—[Zn(acac)$_2$(N,(n-propyl)ethylenediamine)$_2$],
—[Zn(acac)$_2$(N,N-dimethylethylenediamine)],
—[Zn(acac)$_2$(N,N-dimethylethylenediamine)$_2$],
—[Zn(acac)$_2$(N,N'-dimethylethylenediamine)],
—[Zn(acac)$_2$(N,N'-dimethylethylenediamine)$_2$],
—[Zn(acac)$_2$(N,N,N'-trimethylethylenediamine)],
—[Zn(acac)$_2$(N,N,N'-trimethylethylenediamine)$_2$],
—[Zn(acac)$_2$(N,N'-diisopropylethylenediamine)],
—[Zn(acac)$_2$(N,N'-diisopropylethylenediamine)$_2$],
—[Zn(acac)$_2$(N,N-diethylethylenediamine)],
—[Zn(acac)$_2$(N,N-diethylethylenediamine)$_2$],
—[Zn(acac)$_2$(N-methylbutylamine)],
—[Zn(acac)$_2$(N-methylbutylamine)$_2$],
—[Zn(acac)$_2$(N-dibutylamine)],
—[Zn(acac)$_2$(N-dibutylamine)$_2$],
—[Zn(acac)$_2$(n-propylamine)],
—[Zn(acac)$_2$(n-propylamine)$_2$],
—[Zn(acac)$_2$(n-hexylamine)],
—[Zn(acac)$_2$(n-hexylamine)$_2$],
—[Zn(acac)$_2$(n-heptylamine)],
—[Zn(acac)$_2$(n-heptylamine)$_2$],
—[Zn(acac)$_2$(n-octylamine)],
—[Zn(acac)$_2$(n-octylamine)$_2$],
—[Zn(acac)$_2$(n-nonylamine)],
—[Zn(acac)$_2$(n-nonylamine)$_2$],
—[Zn(acac)$_2$(n-decylamine)],
—[Zn(acac)$_2$(n-decylamine)$_2$],
—[Zn(acac)$_2$(n-dodecylamine)],
—[Zn(acac)$_2$(n-dodecylamine)$_2$],
—[Zn(acac)$_2$(N,N-dimethyl-N-butylamine)],
—[Zn(acac)$_2$(N,N-dimethyl-N-butylamine)$_2$,
—[Zn(acac)$_2$(N-ethyl-N-butylamine)],
—[Zn(acac)$_2$(N-ethyl-N-butylamine)$_2$],
—[Zn(acac)$_2$(N,N-diisopropylamine)],
—[Zn(acac)$_2$(N,N-diisopropylamine)$_2$],
—[Zn(acac)$_2$(N,N-dipropylamine)],
—[Zn(acac)$_2$(N,N-dipropylamine)$_2$,
—[Zn(UDD)$_2$(N,(n-propyl)ethylenediamine)],
—[Zn(UDD)$_2$(N,(n-propyl)ethylenediamine)$_2$],
—[Zn(UDD)$_2$(N,N-dimethylethylenediamine)],
—[Zn(UDD)$_2$(N,N-dimethylethylenediamine)$_2$],
—[Zn(UDD)$_2$(N,N'-dimethylethylenediamine)],
—[Zn(UDD)$_2$(N,N'-dimethylethylenediamine)$_2$],
—[Zn(UDD)$_2$(N,N,N'-trimethylethylenediamine)],
—[Zn(UDD)$_2$(N,N,N'-trimethylethylenediamine)$_2$],
—[Zn(UDD)$_2$(N,N'-diisopropylethylenediamine)],
—[Zn(UDD)$_2$(N,N'-diisopropylethylenediamine)$_2$],
—[Zn(UDD)$_2$(N,N-diethylethylenediamine)],
—[Zn(UDD)$_2$(N,N-diethylethylenediamine)$_2$],
—[Zn(UDD)$_2$(N-methylbutylamine)],
—[Zn(UDD)$_2$(N-methylbutylamine)$_2$],
—[Zn(UDD)$_2$(N-dibutylamine)],
—[Zn(UDD)$_2$(N-dibutylamine)$_2$],
—[Zn(UDD)$_2$(n-propylamine)],
—[Zn(UDD)$_2$(n-propylamine)$_2$],
—[Zn(UDD)$_2$(n-hexylamine)],
—[Zn(UDD)$_2$(n-hexylamine)$_2$],
—[Zn(UDD)$_2$(n-heptylamine)],
—[Zn(UDD)$_2$(n-heptylamine)$_2$],
—[Zn(UDD)$_2$(n-octylamine)],
—[Zn(UDD)$_2$(n-octylamine)$_2$], —[Zn(UDD)$_2$(n-nonylamine)],
—[Zn(UDD)$_2$(n-nonylamine)$_2$],
—[Zn(UDD)$_2$(n-decylamine)],
—[Zn(UDD)$_2$(n-decylamine)$_2$],
—[Zn(UDD)$_2$(n-dodecylamine)],
—[Zn(UDD)$_2$(n-dodecylamine)$_2$],
—[Zn(UDD)$_2$(N,N-dimethyl-N-butylamine)],
—[Zn(UDD)$_2$(N,N-dimethyl-N-butylamine)$_2$],
—[Zn(UDD)$_2$(N-ethyl-N-butylamine)],
—[Zn(UDD)$_2$(N-ethyl-N-butylamine)$_2$],
—[Zn(UDD)$_2$(N,N-diisopropylamine)],
—[Zn(UDD)$_2$(N,N-diisopropylamine)$_2$],
—[Zn(UDD)$_2$(N,N-dipropylamine)],
—[Zn(UDD)$_2$(N,N-dipropylamine)$_2$], and with the ligand R50 which is the β-diketonate or the enolate anion of the following β-dicarbonyl compound=β-diketone stearoylbenzoylmethane of formula (7) below:

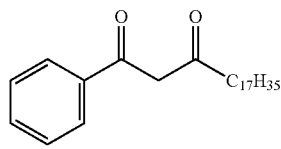

(7)

with the ligand acac which is the β-diketonate or the enolate anion of the following β-dicarbonyl compound=2,4-pentanedione with the ligand UDD which is the β-diketonate or the enolate anion of the following β-dicarbonyl compound=2,4-undecanedione with the ligand DPM which is the β-diketonate or the enolate anion of the following β-dicarbonyl compound=2,2,6,6-tetramethyl-3,5-heptanedione and with the ligand TMOD which is the β-diketonate or the enolate anion of the following β-dicarbonyl compound=2,2,7-trimethyl-3,5-octanedione of formula (8) below:

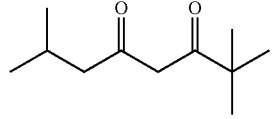

(8)

Example with Zinc Acetylacetonate Hydrate:

To a suspension in 30 ml of diisopropyl ether of 9.89 g of [Zn(acac)$_2$].H$_2$O containing 23.14% by weight of Zn (35 mM) are added 1.01 eq. of dibutylamine (35.35 mM, 4.57 g at 99%). The homogeneous medium is stirred for 1 hour and then evaporated to give 13.7 g of the [Zn(acac)$_2$(dibutylamine)] complex in the form of a sparingly viscous liquid.

$^1$H NMR (CDCl$_3$): 5.27 (2H, s), 2.61 (4H, t), 1.93 (12H, s), 1.47 (4H, quintet), 1.26 (4H, sextet), 0.87 (6H, t).

Example with Benzoylstearoylmethane (R50):
β-diketone stearoylbenzoylmethane of formula (7) below:

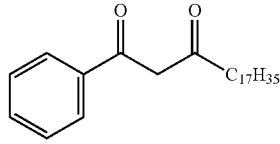

To a suspension of 98.1 g of benzoylstearoylmethane (R50) in 260 g of toluene are added 54 g of a solution of sodium methoxide at 25% in methanol at 20° C., to give a pale yellow homogeneous medium. After 30 minutes, 34.8 g of a solution of zinc chloride at 50% in methanol are added and, after 1 hour, 16.5 g of dibutylamine are added to the suspension. After 30 minutes, the sodium chloride is filtered off and the solution is evaporated at 60° C. and 2 mbar to give 120.7 g of the expected complex (100% yield) as a pale yellow liquid which crystallizes over time (b.p. about 40° C.). Depending on whether one or two equivalents of amine were added, the following complexes were prepared:
—[Zn(R50)$_2$(N-dibutylamine)],
—[Zn(R50)$_2$(N-dibutylamine)$_2$], All the structures were confirmed by $^1$H NMR analysis.

Example 2

Application in an RTV-1 One-Pack System

In RTV-1, the slurry used is prepared as follows: 16 g of a solution of lithium hydroxide at 2% by weight in methanol, then, after 5 min, 400 g of AE55 fumed silica are added, with stirring, to a mixture of 3464 g of a polydimethylsiloxane ended with siloxyl units M$^{OH}$ of the following formula: (CH$_3$)$_2$(OH)SiO$_{1/2}$, with a dynamic viscosity at 25° C. of 20 000 mPa·s and of 120 g of vinyltrimethoxysilane. The mixture was devolatilized under vacuum then stored in a moisture-free environment.

For each test, the catalyst tested was mixed with 50 g of this slurry, and the catalytic potential was then evaluated in 3 ways (see the tables of results below):

the skin-over time (SOT), time at the end of which surface crosslinking is observed, on a 2 mm film;
the persistence of a tacky feel at 48 h;
the hardness (Shore A hardness) of a 6 mm thick bead under controlled conditions (23° C. and 50% relative humidity) and over increasing times (2, 3, 4, 7 and 14 days). The high temperature stability was also evaluated by hardness measurements carried out on the bead after 7 days at room temperature followed by 7 days at 100° C.

NB: The Shore hardness was measured on a 6 mm bead. In the tables of results the symbol ">" corresponds to the hardness values measured on the upper part of the bead and the symbol "<" corresponds to the hardness values measured on the lower part of the bead that is less exposed to the ambient air than the upper part.

Amines tested:
N,N'-dimethylethylenediamine=DMED
N-(n-propyl)ethylenediamine=PrED
ligand TMOD=β-diketonate or enolate anion of the following β-dicarbonyl compound=2,2,7-trimethyl-3,5-octanedione of formula (8) below:

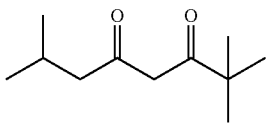

(8)

TABLE 1

| Test | Catalyst tested | amount of catalyst per 50 g of slurry | Skin-over time (minutes) | Tacky feel after 48 hours | Shore A hardness over 6 mm 2 d > < | 4 d > < |
|---|---|---|---|---|---|---|
| 1 | [Zn(TMOD)$_2$ | 2.1 mM | 90 | yes | 7 9 | 18 20 |
| 2 | [Zn(TMOD)$_2$(DMED)] | 2.1 mM | 25 | no | 23 16 | 29 25 |
| 3 | [Zn(TMOD)$_2$(PrED)] | 2.1 mM | 45 | no | 19 15 | 28 22 |

The catalysts according to the invention show better hardnesses and no longer have the problems associated with the "tacky feel" of the corresponding non-amino catalyst.

Example 3

RTV-2 Two-Pack Composition—Polyethyl Silicate Crosslinking Agent (a1): a polydimethylsiloxane ended with siloxyl units $M^{OH}$ of the following formula: $(CH_3)_2(OH)SiO_{1/2}$, with a dynamic viscosity at 25° C. equal to 14 000 mPa·s;

(b1): fumed silica with a BET specific surface area of 200 m$^2$/g, treated with hexamethyldisilazane (HMDZ), dispersed in a mixture of hydroxylated polydimethylsiloxane oil (a1) and of a polydimethylsiloxane oil blocked at each of the chain ends with a siloxyl unit M having the following formula $(CH_3)_3SiO_{1/2}$;

(b2): ground quartz with a mean particle diameter of 10 m;

(d1): catalyst tested;

(e): polyethyl silicate.

The activity of the catalyst according to the invention [Zn(TMOD)$_2$(N,N-dimethylethylenediamine)] is evaluated relative to the corresponding but non-amino zinc complex [Zn(TMOD)$_2$].

TMOD is the β-diketonate or the enolate anion of the following β-dicarbonyl compound=2,2,7-trimethyl-3,5-octanedione of formula (8) below:

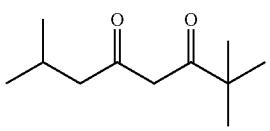

To do this, a slurry is prepared from the following constituents:

20.4 g of an α,ω-dihydroxylated oil (a1),
61.3 g of a filler (b1), and
18.3 g of a filler (b2), to which are added 1.5 g of polyethyl silicate (crosslinking agent) per 100 g of slurry and x grams (y mmol) of the catalyst to be tested (d1).

For the zinc catalysts (according to the invention or for the comparative), the amounts tested are added to 1.5 ml of the solvent methyl tert-butyl ether (MTBE).

TABLE 2

Constituents of the RTV-2 compositions tested (polyethyl silicate crosslinking agent)

| Ingredients | Examples according to the invention (grams) |
|---|---|
| (a1) | 20.4 |
| (b1) | 61.3 |
| (b2) | 18.3 |
| (e) | 1.5 g per 100 g |
| (d1) | 2.66 mmol per 100 g of slurry |

In RTV-2, the tests are performed directly on a mixture consisting of ingredients (a1), (b1), (b2) and (e), to which is added and mixed the catalyst to be tested (d1). The working time or pot life is first measured (time after which the viscosity of the mixture prevents its use, i.e. the time required for the formation of a gel), and, from another mixture, a slug 6 mm thick is then cast and, after curing, the Shore A hardnesses (above and below) of a demolded slug 6 mm thick are measured under regulated conditions (23° C. and 50% relative humidity) and over increasing times. In the tables of results, the symbol ">" corresponds to the hardness values measured on the upper part of the slug and the symbol "<" corresponds to the hardness values measured on the lower part of the slug that is less exposed to the ambient air than the upper part. Measurement of the Shore A hardness, noted SAH=measurements performed according to the indications of standard ASTM-D 2240. The working time or pot life is the time beyond which the viscosity of the mixture prevents its use.

TABLE 3

RTV-2 tests-polyethyl silicate crosslinking agent

| Tests | Catalyst tested (d1) | Working time (min) | Shore A hardness over 6 mm 1 day > < | 3 days > < |
|---|---|---|---|---|
| 4 | [Zn(TMOD)$_2$)] | 18 | 16* 17 | 20* 22 |
| 5 | [Zn(TMOD)$_2$ (N,N-dimethylethylenediamine)] | 42 | 19 18 | 24 23 |

For test 1, the symbol "*" indicates that the feel remains tacky even after 3 days.

Example 4

RTV-2 Two-Pack Composition for Molding Application (Organosilicon Compound A=α,ω-Dihydroxylated Polydimethylsiloxane; Alkoxy Crosslinking Agent)

In the present examples:
the "pot life" corresponds to a gelation time at 23° C., in minutes, measured with an automatic machine with alternating movement according to AFNOR standard NF T-77 107,
the abbreviation "SAH" means the Shore A (written ShA) hardness, measured on the confined face of a slug 6 mm thick according to standard ASTM D-2240. The SAH indicated in parentheses corresponds to the hardness measured on the upper face of the slug (in contact with the air),
the "SAH 24 h" corresponds to the hardness after 24 hours of crosslinking at room temperature,
the "final SAH" corresponds to the hardness after total crosslinking at room temperature,
the abbreviation "BS" means the breaking strength, in MPa, according to AFNOR standard NF T-46002,
the abbreviation "EB" means the elongation at break, in %, according to the preceding standard,
the abbreviation "Ts" means the tear strength in N/mm.

A two-pack composition comprising parts P1 and P2 is prepared, the compositions of which are described in Table 4.

1) Nature of the Ingredients Mentioned in Part P2 of the Compositions Tested a: Slurry consisting of a mixture of α,ω-dihydroxylated polydimethylsiloxane oil (25.6% by weight, of viscosity 14 000 mPa·s) and Aerosil® 200 fumed silica treated in situ with hexamethyldisilazane (HMDZ) and with a specific surface area of 200 m$^2$/g, b1: Polydimethylsiloxane oil blocked at each of the chain ends with an $(HO)(CH_3)_2SiO_{1/2}$ unit, having a viscosity of 14 000 mPa·s at 25° C.

b2: Polydimethylsiloxane oil blocked at each of the chain ends with an $(HO)(CH_3)_2SiO_{1/2}$ unit, having a viscosity of 3500 mPa·s at 25° C.

c: Ground quartz (sold by the company Sifraco), d: Polydimethylsiloxane oil blocked at each of the chain ends with an $(HO)(CH_3)_2SiO_{12}$ unit, having a viscosity of 750 mPa·s at 25° C.

e: Water f: Coloring base

2) Nature of the Ingredients Mentioned in Part P1 of the Compositions g1,x: Catalyst $[Zn(R50)_2(Octylamine)_x]$, noted $[Zn(R50)_2(OA)_x]$ g2,x: Catalyst $[Zn(R50)_2(Dibutylamine)_x]$, noted $[Zn(R50)_2(DBA)_x]$ g3,x: Catalyst $[Zn(R50)_2(Dimethylethylenediamine)_x]$, noted $[Zn(R50)_2(DMEDA)_x]$ g4,x: Catalyst $[Zn(R50)_2(Diisopropylethylenediamine)_x]$, noted $[Zn(R50)_2(DIPEDA)_x]$ g5,x: Catalyst $[Zn(R50)_2(Methylbutylamine)_x]$, noted $[Zn(R50)_2(MBA)_x]$ g6,x: Catalyst $[Zn(R50)_2(Diisopropylamine)_x]$, noted $[Zn(R50)_2(DIPA)_x]$ g7,x: Catalyst $[Zn(R50)_2(Ethylbutylamine)_x]$, noted $[Zn(R50)_2(EBA)_x]$ g8: Dimethyltin dineodecanoate, of formula $[C_9H_{19}COO]_2 Sn(Me)_2]$, sold under the reference Fomrez® Catalyst UL-28 h: Partially hydrolyzed and condensed ethyl silicate, characterized by a content of (OEt) unit=14 mmol/g i: Polydimethylsiloxane oil blocked at each of the chain ends with a $(CH_3)_3SiO_{1/2}$ unit, having a viscosity of 50 mPa·s at 25° C.

j: Plasticizer sold under the name Mediaplast.

Table 4 below describes the compositions tested:

TABLE 4

| Part P2 | P2-a | P2-b |
|---|---|---|
| a1 | 60.2 | 60.2 |
| b1 | 20 | 0 |
| b2 | 0 | 20 |
| c | 18 | 18 |
| d | 1 | 1 |
| e | 0.1 | 0.1 |
| f | 0.7 | 0.7 |

TABLE 5

| Part P1 | P1-a | P1-b | P1-c | P1-d | P1-e | P1-f | P1-g | P1-h (Comparative example) |
|---|---|---|---|---|---|---|---|---|
| Cata Nature | g1, x x = 1 | g2, x x = 1 | g3, x x = 0.5 | g4, x x = 0.75 | g5, x x = 1 | g6, x x = 1 | g7, x x = 1 | g8 |
| % | 34.6 (2eq) | 25.9 (1.5eq) | 39.5 (2.5eq) | 50.7 (3eq) | 24.7 (1.5eq) | 33.6 (2eq) | 25.2 (1.5eq) | 8.8 (1eq) |
| h | 30 | 30 | 30 | 40 | 30 | 30 | 30 | 30 |
| i + j | 35.4 | 44.1 | 30.5 | 9.3 | 45.3 | 36.4 | 44.8 | 61.2 |

3) Implementation

To 100 parts by weight of component P2 are added 5 parts by weight of component P1. Crosslinking is obtained after manual mixing using a spatula, at 23° C. The crosslinking kinetics profile is expressed by the pot life and the SAH 24 h measurement. The properties of the crosslinked elastomer are measured (final SAH and optionally the mechanical properties).

4) Tests

4a) Examples 1a to 1g

In these examples, RTV-2 products are prepared by mixing the part P2 with parts P1 containing a catalyst of mean formula [Zn(R50)$_2$(amine)$_x$] and a given amount of partially hydrolyzed and condensed ethyl silicate as crosslinking agent. Various amines are tested. The compositions are detailed in tables 4 and 5. The results are collated below.

sized catalyst of mean formula [Zn(ND)$_2$(OA)] and various amounts of partially hydrolyzed and condensed ethyl silicate as crosslinking agent. The compositions are detailed in tables 4 and 5. The results are collated below.

TABLE 6

Examples according to the invention and comparative example

| | Examples | | | | | | | |
|---|---|---|---|---|---|---|---|---|
| | 1a | 1b | 1c | 1d | 1e | 1f | 1g | Comp. 1h |
| Part P2 | P2-a | P2-a | P2-a | P2-a | P2-a | P2-a | P2-a | P2-b |
| Part P1 | P1-a | P1-b | P1-c | P1-d | P1-e | P1-f | P1-g | Comp. P1-h |
| (Amine) | (OA) | (DBA) | (DMEDA) | (DIPEDA) | (MBA) | (DIPA) | (EBA) | (with tin) |
| OR/OH | 15 | 15 | 15 | 20 | 15 | 15 | 15 | 13 |
| | | | | Evaluation | | | | |
| Pot life | 65 | 36 | 109 | 99 | 31 | 39 | 39 | 81 |
| SAH 24 h | 17 (17) | 19 (19) | 15 (13) | 12 (13) | 18 (17) | 16 (14) | 18 (15) | 21 (22) |
| Final SAH | 23 (24) | 24 (24) | 23 (20) | 27 (27) | 24 (24) | 25 (25) | 23 (23) | 25 (25) |
| BS | 3 | 3.3 | / | 3.2 | / | / | / | 4.2 |
| EB | 340 | 375 | / | 400 | / | / | / | 425 |
| Ts | 18 | 18 | / | 18 | / | / | / | 23 |

*The ratio OR/OH = mole ratio (alcoxy function (OR) of the crosslinking agent)/(OH function of silanol type of the α,ω-dihydroxylated polydimethylsiloxane).

The above examples demonstrate the efficacy of these novel catalysts for catalyzing the polycondensation reaction and for forming an elastomeric network with good mechanical properties, similar to those obtained conventionally with tin. Furthermore, it is noted that the crosslinking takes place in the same manner when confined and on contact with air (specifically, the SAH results are equivalent on the confined face and on the upper face).

Furthermore, it is interesting to note that the reactivity of the zinc diketonate catalysts may be modified by modifying the nature of the amine ligand, thus making it possible to obtain various kinetic profiles that are particularly suited to the various needs of the molding application:

with the complexes [Zn(R50)$_2$(OA)] and [Zn(R50)$_2$(DMEDA)$_{0.5}$]**, a good compromise for the molding application in general is achieved in terms of the pot life (lifetime of the bath) without loss of hardness at 24 hours and finally.

For [Zn(R50)$_2$ (DMEDA)$_{0.5}$]**: In the case where, during the synthesis, a variable amount of amine is used (>0 equivalent and ≤2 equivalents, or a slight excess), a mixture is obtained comprising the complexes: [Zn(β-diketonate)$_2$(amine)]+[Zn(β-diketonate)$_2$(amine)$_2$]. The following nomenclature will then be used in this case: [Zn(β-diketonate)$_2$(amine)$_x$]* and the value of the symbol "x" refers to the number of moles of amine added during the preparation of the complex and which have reacted (i.e. which are present in the complex as ligand). This type of nomenclature will be identified in the examples by insertion of the symbol "*" into the formula of the complex.

with the complexes of mean formulae [Zn(R50)$_2$(DBA)], [Zn(R50)$_2$(MBA)], [Zn(R50)$_2$(DIPA)] and [Zn(R50)$_2$(EBA)], it is possible to greatly accelerate the crosslinking kinetics, which is occasionally necessary in order to increase the production efficiency, while at the same time conserving an acceptable pot life.

4b) Examples 2a and 2b

In these examples, RTV-2 products are prepared by mixing a part P2 (a or b) with parts P1 containing the synthe-

TABLE 7

Examples according to the invention with Zn(R50)$_2$(OA)

| | Examples | |
|---|---|---|
| | 2a | 2b |
| Part P2 | P2-a | P2-b |
| | (based on b1 - Viscosity = 14 000 mPa · s) | (based on b2 - Viscosity = 3500 mPa · s) |
| Part P1 | P1-a | P1-a |
| | Evaluation | |
| Pot life | 65 | 99 |
| SAH 24 h | 17 (17) | 16 (16) |
| Final SAH | 23 (24) | 24 (25) |
| BS | 3 | 3.2 |
| EB | 340 | 350 |
| Ts | 18 | 17 |

The above examples show that it is possible to increase the pot life (=lifetime of the bath) by replacing only the α,ω-dihydroxylated polydimethylsiloxane oil with a viscosity of 14 000 mPa·s used in the part P2-a with an α,ω-dihydroxylated polydimethylsiloxane oil of lower viscosity 3500 mPa·s (part P2-b), without deteriorating the SAH 24 h hardness or the final SAH hardness.

5-a) Evaluation of the Catalysts in a Functionalization Reaction 70 g of an α,ω-bis(dimethylhydroxysilyl)polydimethylsiloxane oil with a dynamic viscosity at 25° C. of 750 mPa·s (48V750 oil), 6 g of methyltrimethoxysilane (MTMS) and 3 g of vinyltrimethoxysilane (VTMO) are mixed together in a 100 ml polypropylene jar, stirring with a magnetic bar and under an argon atmosphere. The catalyst is added (with stirring between each addition) and the mixture is stirred at 700 rpm. Samples (about 0.5 ml) are taken after 15 min, 30 min, 1 hour or more. A few drops of butyl titanate are added to the samples. If the conversion is not complete, a gel forms instantaneously during mixing using a spatula. If the conversion is complete, the mixture remains fluid. The results of this test are given in the "Functionalization complete in" column in Table 8 below:

5-b) Evaluation of the Catalysts in a Crosslinking Reaction (Curing on Contact with Atmospheric Moisture after Functionalization)

70 g of an α,ω-bis(dimethylhydroxysilyl)polydimethylsiloxane oil with a dynamic viscosity at 25° C. of 750 mPa·s (48V750 oil), 6 g of methyltrimethoxysilane (MTMS) and 3 g of vinyltrimethoxysilane (VTMO) are mixed together in a 100 ml polypropylene jar, the test catalyst is added and the mixture is stirred at 700 rpm with a magnetic bar and under an argon atmosphere, i.e. in the absence of atmospheric moisture, for 1 hour so as to perform the functionalization. The mixture is then poured into the lid of the container and placed in the presence of atmospheric moisture so as to estimate the catalytic effect on the curing of the composition.

The activities of catalysts according to the invention [Zn(acac)$_2$(DBA)][Zn(acac)$_2$(DBA)$_2$] were compared with the separate addition of the complex [Zn(acac)$_2$.H$_2$O] followed by the addition of an amount of 243 µl (large molar access) of N,N-dibutylamine (DBA). It is noted that N,N-dibutylamine is a functionalization catalyst even when it is used alone and also the complex [Zn(acac)$_2$.H$_2$O] taken alone. However, they are effective for only 2 hours. Comparative 3a), [Zn(acac)$_2$.H$_2$O](92 mg) followed by 243 µl of DBA, according to patent application US 2008/0 207 938, shows that the result obtained as curing catalyst in the presence of atmospheric moisture (4 days) is different from the two catalysts according to the invention [Zn(acac)$_2$(DBA)$_2$] and [Zn(acac)$_2$(DBA)$_2$].

TABLE 8

| Catalyst | Functionalization complete in | Appearance at 4 days on contact with atmospheric moisture |
| --- | --- | --- |
| Comparative 3a: [Zn(acac)$_2$•H$_2$O] (92 mg) followed by 243 µl DBA patent application US 2008/0 207 938 | 15 min or less | Skin on surface but soft |
| Comparative 3b: [Zn(acac)$_2$•H$_2$O] (92 mg) alone | 2 hr-2 hours 30 min | Fluid liquid |
| Comparative 3c: DBA (243 µl) alone | 2 hr | Fluid liquid |
| Invention 3d: [Zn(acac)$_2$(DBA)] 138 mg (0.35 mmol) | 15 min or less | Gel in form of thick liquid |
| Invention 3e: [Zn(acac)$_2$(DBA)$_2$] 183 mg (0.35 mmol) | 15 min or less | Gel in form of thick liquid |
| Invention 3f: [Zn(R50)$_2$(DBA)] 337 mg (0.35 mmol) | 15-30 minutes | Gel in form of thick liquid |

The invention claimed is:

1. A composition comprising:
   at least one organosilicon compound A comprising at least two identical or different hydrolyzable and condensable groups, or at least two silanol functions ≡SiOH,
   at least one crosslinking agent B,
   optionally at least one filler C, and
   a catalytically effective amount of at least one polycondensation catalyst M which is a zinc complex comprising in its structure a first type of ligand that is a β-diketonate and a second type of ligand that is an amine,
   wherein the polycondensation catalyst(s) M is obtained:
   a) by reacting per 1 mol of at least one zinc complex of formula [Zn(β-diketonate)$_2$] or of a mixture of two different zinc complexes of formula [Zn(β-diketonate)$_2$] X$^1$ mol of amine or a mixture of amines, with X$^1$≤2.5 molar equivalents relative to the zinc, optionally in the presence of a solvent so as to obtain a reaction product comprising:
      x mol of a zinc complex A which is a complex of formula [(Zn(β-diketonate)$_2$)$_r$(amine)]$_{z'}$,
      y mol of a zinc complex B which is a complex of formula [(Zn(β-diketonate)$_2$)$_r$(amine)]$_{z''}$,
      with x≥0, y≥0, the symbol r≥1, and the symbol z' is an integer greater than or equal to 1,
      optionally X$^3$ mol of the complex [Zn(β-diketonate)$_2$], and
      optionally X$^4$ mol of residual unreacted amine, and
   b) after optionally removing the solvent and the residual amine, the polycondensation catalyst(s) M are recovered in the form of at least one zinc complex A, at least one zinc complex B or a mixture of zinc complex A and of zinc complex B, with optionally a residual amount of X$^3$ mol of the complex [Zn(β-diketonate)$_2$], and
   the symbols X', X$^3$ and X$^4$ are integers and the sum x+y+X$^3$=1.

2. The composition as claimed in claim 1, comprising:
   at least one organosilicon compound A comprising at least two identical or different hydrolyzable and condensable groups, or at least two silanol functions ≡SiOH,
   at least one crosslinking agent B,
   optionally at least one filler C, and
   a catalytically effective amount of at least one polycondensation catalyst M which is a complex of formula (1) below:

$$[Zn(C^1)_{n'}(C^2)_{n''}(L^1)_{y'}(L^2)_{y''}(X)_{x'}]_{z'}\cdot(H_2O)_{x''} \quad (1)$$

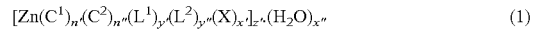

in which:
      the symbols C$^1$ and C$^2$ are identical or different ligands chosen from the group of β-diketonates,
      the symbols n' and n" are integers equal to 0, 1 or 2 with the condition that the sum n'+n"=2,
      the symbols L$^1$ and L$^2$ are identical or different ligands chosen from the group of amines,
      the symbols y' and y" represent the number of amine ligands and are integers equal to 0, 1 or 2 with the condition that the sum y'+y"=1 or 2,
      the symbol X is a ligand other than C$^1$, C$^2$, L$^1$ and L$^2$,
      the symbol x'≥0,
      the symbol x"≥0, and
      the symbol z' is an integer greater than or equal to 1.

3. The composition as claimed in claim 2, in which the polycondensation catalyst M is a complex of formula (2) below:

$$[Zn(C^1)_{n'}(C^2)_{n''}(L^1)_{y'}(L^2)_{y''}]_{z'} \quad (2)$$

in which:
      the symbols C$^1$ and C$^2$ are identical or different ligands chosen from the group of β-diketonates,
      the symbols n' and n" represent the number of β-diketonate ligands and are integers equal to 0, 1 or 2 with the condition that the sum n'+n"=2,
      the symbols L$^1$ and L$^2$ are identical or different ligands chosen from the group of amines,
      the symbols y' and y" represent the number of amine ligands and are integers equal to 0, 1 or 2 with the condition that the sum y'+y"=1 or 2, and
      the symbol z' is an integer greater than or equal to 1.

4. The composition as claimed in claim 2, in which the ligand of amine type L$^1$ or L$^2$ is chosen from the group consisting of primary monoamines of alkylamine type containing in total from 1 to 40 carbon atoms for the alkyl radical, secondary monoamines of dialkylamino type containing in total from 2 to 40 carbon atoms for the alkyl radicals, tertiary monoamines of trialkylamine type containing in total from 3 to 60 carbon atoms for the alkyl radicals, alkyl diamines containing in total from 1 to 40 carbon atoms for the alkyl radicals and amino silanes.

5. The composition as claimed in claim 2, in which the ligands $C^1$ and when the ligand $C^2$ is present are β-diketonates or enolate anions of a β-dicarbonyl compound of formula (5) below:

$$R^1COCHR^2COR^3 \qquad (5)$$

in which:
R$^1$ and R$^3$, independently of each other, represent a $C_1$ to $C_{30}$ hydrocarbon-based radical, a $C_6$ to $C_{30}$ hydrocarbon-based radical comprising an aromatic ring or a radical
—OR$^4$ with R$^4$ which represents a $C_1$ to $C_{30}$ hydrocarbon-based radical, and
R$^2$ is a hydrogen or a $C_1$ to $C_{30}$ hydrocarbon-based radical.

6. The composition as claimed in claim 1, in which the polycondensation catalyst M is a complex of formula (3) below:

$$[(Zn(C^1)_2)_r(L^1)_{y'}]_{z'} \qquad (3)$$

in which:
the symbol $C^1$ is a ligand chosen from the group of β-diketonates,
the symbol $L^1$ is a ligand chosen from the group of amines,
the symbol y' is a number equal to 1 or 2,
the symbol r≥1, and
the symbol z' is an integer greater than or equal to 1.

7. The composition as claimed in claim 1, in which the ligand of amine type $L^1$ or $L^2$ is chosen from the group consisting of the following amines: N,N-dimethylethylenediamine, N,N'-dimethylethylenediamine, N,N,N'-trimethylethylenediamine, N,N'-diisopropylethylenediamine, n-butylamine, n-propylamine, n-heptylamine, n-octylamine, n-nonylamine, tert-butylamine, isopropylamine, 2-ethylhexylamine, decylamine, dodecylamine, which may be linear or branched, N-methyl-N-butylamine, N,N-dipropylamine, N,N-diisopropylamine, N-ethyl-N-butylamine, N,N-dibutylamine, N,N-dimethyl-N-butylamine, di(n-octyl)amine, N-n-propylethylenediamine, N,N,N',N'-tetramethylethylenediamine, 3-aminopropyltrimethoxysilane and 3-aminopropylmethyldiethoxysilane.

8. The composition as claimed in claim 1, in which the ligands $C^1$ and when the ligand $C^2$ is present are β-diketonates or enolate anions of a β-dicarbonyl compound of formula (4) below:

$$R^1COCHR^2COR^3 \qquad (4)$$

in which:
R$^1$ and R$^3$, independently of each other, represent a $C_1$ to $C_{30}$ hydrocarbon-based radical, a $C_6$ to $C_{30}$ hydrocarbon-based radical comprising an aromatic ring or a radical —OR$^4$ with R$^4$ which represents a $C_1$ to $C_{30}$ hydrocarbon-based radical,
R$^2$ is a hydrogen or a $C_1$ to $C_{30}$ hydrocarbon-based radical, with
R$^1$ and R$^2$ may be linked via a radical and R$^2$ may be linked to R$^1$ or R$^3$ via a radical.

9. The composition as claimed in claim 1, in which the polycondensation catalyst M is a complex of formula (6) below:

$$[(Zn(C^1)_2)_r(L^1)_{y'}]_{z'} \qquad (6)$$

in which:
the symbol y' is an integer equal to 1 or 2,
the symbol r≥1 and
the symbol z' is an integer greater than or equal to 1,
the symbol $L^1$ is a ligand chosen from the group consisting of the following compounds:
N,N-dimethylethylenediamine, N,N'-dimethylethylenediamine, N-(n-propyl)ethylenediamine, N,N,N'-trimethylethylenediamine, N,N'-diisopropylethylenediamine, N,N-diethylethylenediamine, N,N'-diethylethylenediamine, N,N,N',N'-tetramethylethylenediamine, N-methylbutylamine, N-dibutylamine, n-propylamine, n-hexylamine, n-heptylamine, n-octylamine, n-nonylamine, n-decylamine, n-dodecylamine, tert-butylamine, isopropylamine, 2-ethylhexylamine, bis(2-ethylhexyl)amine, diisononylamine, N,N-dipropylamine, N,N-dihexylamine, N,N-diheptylamine, N,N-dioctylamine, N,N-diisopropylamine, N-ethyl-N-butylamine, N,N-dimethyl-N-butylamine, 3-aminopropyltrimethoxysilane and 3-aminopropylmethyldiethoxysilane, and the symbol $C^1$ is chosen from the group consisting of the β-diketonates or the enolate anions of the following β-dicarbonyl compounds:
2,4-pentanedione; 2,4-hexanedione; 2,4-heptanedione; 2,4-octanedione; 2,4-nonanedione; 2,4-decanedione; 2,4-undecanedione; 2,4-dodecanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; stearoylbenzoylmethane; 4-t-butyl-4'-methoxydibenzoylmethane; 4,4'-dimethoxydibenzoylmethane, 4,4'-di-tert-butyldibenzoylmethane; 2,2,6,6-tetramethyl-3,5-heptanedione, ethyl acetoacetate and isopropyl acetoacetate, a β-diketone stearoylbenzoylmethane or 1-phenyl-3-eicosanedione of formula (7) below:

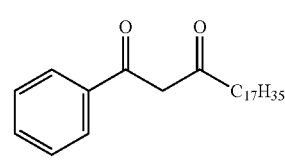

(7)

a β-diketone 2,2,7-trimethyl-3,5-octanedione of formula (8) below:

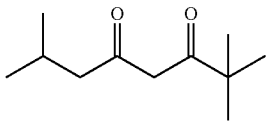 (8)

and the acetylacetic acid esters of formula (9) below:

$$CH_3COCH_2COOR \quad (9)$$

with R=methyl, ethyl, n-propyl, isopropyl, n-butyl, sec-butyl, isobutyl, tert-butyl, isopentyl, n-hexyl, n-octyl, methyl-1 heptyl, n-nonyl, n-decyl and n-dodecyl.

10. The composition as claimed in claim 1, in which the organosilicon compound A is a polyorganosiloxane comprising:
(i) at least two siloxyl units of formula (10) below:

 (10)

in which:
the symbols $R^1$, which may be identical or different, represent $C_1$ to $C_{30}$ monovalent hydrocarbon-based radicals,
the symbols Z, which may be identical or different, each represent a hydrolyzable and condensable group or a hydroxyl group,
a is equal to 0, 1 or 2, b is equal to 1, 2 or 3, the sum a+b is equal to 1, 2 or 3, and optionally
(ii) one or more siloxyl units of formula (11) below:

 (11)

in which:
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, and
the symbol c is equal to 0, 1, 2 or 3.

11. The composition as claimed in claim 1, in which the crosslinking agent B is a silicon compound, each molecule of which comprises at least three hydrolyzable and condensable groups Y and said crosslinking agent B having formula (12) below:

 (12)

in which formula:
the symbol R' is a monovalent hydrocarbon-based radical comprising from 1 to 30 carbon atoms,
the symbol Y is an alkoxy, alkoxy-alkylene-oxy, amino, amido, acylamino, aminoxy, iminoxy, ketiminoxy, acyloxy or enoxy group and preferably Y is an alkoxy, acyloxy, enoxy, ketiminoxy or oxime group, the symbol a=3 or 4.

12. The composition as claimed in claim 1, not containing any catalyst containing in its structure at least one tin atom.

13. The composition as claimed in claim 1, in which the polycondensation catalyst M is the only polycondensation catalyst present in said composition, which may optionally contain at least one functionalization catalyst.

14. An RTV two-pack composition, which is in two separate packages P1 and P2, wherein:
the package P1, which is airtight, comprises:
a catalytically effective amount of at least one polycondensation catalyst M which is a zinc complex comprising in its structure a first type of ligand that is a β-diketonate and a second type of ligand that is an amine, and
at least one crosslinking agent B, and
the package P2 does not contain said polycondensation catalyst M and said crosslinking agent B and comprises:
per 100 parts by weight of at least one organosilicon compound A comprising at least two identical or different hydrolyzable and condensable groups, or at least two silanol functions ≡SiOH, and
from 0 to 10 part(s) by weight of water.

15. An elastomer obtained:
after mixing the contents of the packages P1 and P2 of the RTV two-pack composition as defined according to claim 14 and leaving the mixture to cure.

16. An RTV two-pack composition for molding application, which is in two separate packages P1 and P2, wherein:
the package P1, which is airtight, comprises:
a catalytically effective amount of at least one polycondensation catalyst M which is a zinc complex comprising in its structure a first type of ligand that is a β-diketonate and a second type of ligand that is an amine, and
at least one crosslinking agent B and
the package P2 does not contain said polycondensation catalyst M and said crosslinking agent B and comprises:
per 100 parts by weight of at least one organosilicon compound A which is a α,ω-bis(dimethylhydroxysilyl) polydimethylsiloxane whose dynamic viscosity at 25° C. is between 2000 mPa·s and 5000 mPa·s, and
from 0 to 10 part(s) by weight of water.

17. An RTV one-pack composition which is in a single airtight package P, comprising:
a) at least one organosilicon compound A comprising at least two identical or different hydrolyzable and condensable groups, or at least two silanol functions ≡SiOH,
b) at least one crosslinking agent B, and
c) a catalytically effective amount of at least one polycondensation catalyst M which is a zinc complex comprising in its structure a first type of ligand that is a β-diketonate and a second type of ligand that is an amine, and
d) optionally at least one filler C.

18. A process for coating a composition onto a flexible support S which is made of textile, paper, polyvinyl chloride, polyester, polypropylene, polyamide; polyethylene; polyurethane or polyethylene terephthalate, comprising steps a), b) and c) below:
a) preparing the composition,
b) said composition is then deposited in continuous or batch manner onto said flexible support S, and c) said silicone composition X is left to crosslink in the presence of moisture provided by ambient air or by prior addition of water so as to form a silicone elastomer, wherein said composition comprises:
at least one organosilicon compound A comprising at least two identical or different hydrolyzable and condensable groups, or at least two silanol functions ≡SiOH,
at least one crosslinking agent B,
optionally at least one filler C, and
a catalytically effective amount of at least one polycondensation catalyst M which is a zinc complex comprising in its structure a first type of ligand that is a β-diketonate and a second type of ligand that is an amine.

19. A complex having the following formula:
[Zn(R50)$_2$(N,(n-propyl)ethylenediamine)],
[Zn(R50)$_2$(N,(n-propyl)ethylenediamine)$_2$],
[Zn(R50)$_2$(N,N-dimethylethylenediamine)],
[Zn(R50)$_2$(N,N-dimethylethylenediamine)$_2$],
[Zn(R50)$_2$(N,N'-dimethylethylenediamine)],
[Zn(R50)$_2$(N,N'-dimethylethylenediamine)$_2$],
[Zn(R50)$_2$(N,N,N'-trimethylethylenediamine)],
[Zn(R50)$_2$(N,N,N'-trimethylethylenediamine)$_2$],
[Zn(R50)$_2$(N,N'-diisopropylethylenediamine)],
[Zn(R50)$_2$(N,N'-diisopropylethylenediamine)$_2$],
[Zn(R50)$_2$(N,N-diethylethylenediamine)],
[Zn(R50)$_2$(N,N-diethylethylenediamine)$_2$],
[Zn(R50)$_2$(N-methylbutylamine)],
[Zn(R50)$_2$(N-methylbutylamine)$_2$],
[Zn(R50)$_2$(N-dibutylamine)],
[Zn(R50)$_2$(N-dibutylamine)$_2$],
[Zn(R50)$_2$ (n-propylamine)],
[Zn(R50)$_2$ (n-propylamine)$_2$],
[Zn(R50)$_2$ (n-hexylamine)],
[Zn(R50)$_2$ (n-hexylamine)$_2$],
[Zn(R50)$_2$ (n-heptylamine)],
[Zn(R50)$_2$ (n-heptylamine)$_2$],
[Zn(R50)$_2$ (n-octylamine)],
[Zn(R50)$_2$ (n-octylamine)$_2$],
[Zn(R50)$_2$ (n-nonylamine)],
[Zn(R50)$_2$ (n-nonylamine)$_2$],
[Zn(R50)$_2$ (n-decylamine)],
[Zn(R50)$_2$ (n-decylamine)$_2$],
[Zn(R50)$_2$ (n-dodecylamine)],
[Zn(R50)$_2$ (n-dodecylamine)$_2$],
[Zn(R50)$_2$(N,N-dimethyl-N-butylamine)],
[Zn(R50)$_2$(N,N-dimethyl-N-butylamine)$_2$],
[Zn(R50)$_2$(N-ethyl-N-butylamine)],
[Zn(R50)$_2$(N-ethyl-N-butylamine)$_2$],
[Zn(R50)$_2$(N,N-diisopropylamine)],
[Zn(R50)$_2$(N,N-diisopropylamine)$_2$],
[Zn(R50)$_2$(N,N-dipropylamine)],
[Zn(R50)$_2$(N,N-dipropylamine)$_2$],
[Zn(TMOD)$_2$(N,N'-dimethylethylenediamine)$_2$],
[Zn(TMOD)$_2$(N,N,N'-trimethylethylenediamine)],
[Zn(TMOD)$_2$(N,N,N'-trimethylethylenediamine)$_2$],
[Zn(TMOD)$_2$(N,N'-diisopropylethylenediamine)],
[Zn(TMOD)$_2$(N,N'-diisopropylethylenediamine)$_2$],
[Zn(TMOD)$_2$(N,N-diethylethylenediamine)],
[Zn(TMOD)$_2$(N,N-diethylethylenediamine)$_2$],
[Zn(TMOD)$_2$(N-methylbutylamine)],
[Zn(TMOD)$_2$(N-methylbutylamine)$_2$],
[Zn(TMOD)$_2$(N-dibutylamine)],
[Zn(TMOD)$_2$(N-dibutylamine)$_2$],
[Zn(TMOD)$_2$ (n-propylamine)],
[Zn(TMOD)$_2$ (n-propylamine)$_2$],
[Zn(TMOD)$_2$ (n-hexylamine)],
[Zn(TMOD)$_2$ (n-hexylamine)$_2$],
[Zn(TMOD)$_2$ (n-heptylamine)],
[Zn(TMOD)$_2$ (n-heptylamine)$_2$],
[Zn(TMOD)$_2$ (n-octylamine)],
[(Zn(TMOD)$_2$ n-octylamine)$_2$],
[Zn(TMOD)$_2$ (n-nonylamine)],
[Zn(TMOD)$_2$ (n-nonylamine)$_2$],
[Zn(TMOD)$_2$ (n-decylamine)],
[Zn(TMOD)$_2$ (n-decylamine)$_2$],
[Zn(TMOD)$_2$ (n-dodecylamine)],
[Zn(TMOD)$_2$ (n-dodecylamine)$_2$],
[Zn(TMOD)$_2$(N,N-dimethyl-N-butylamine)],
[Zn(TMOD)$_2$(N,N-dimethyl-N-butylamine)$_2$],
[Zn(TMOD)$_2$(N-ethyl-N-butylamine)],
[Zn(TMOD)$_2$(N-ethyl-N-butylamine)$_2$],
[Zn(TMOD)$_2$(N,N-diisopropylamine)],
[Zn(TMOD)$_2$(N,N-diisopropylamine)$_2$],
[Zn(TMOD)$_2$(N,N-dipropylamine)],
[Zn(TMOD)$_2$(N,N-dipropylamine)$_2$],
[Zn(DPM)$_2$(N-(n-propyl)ethylenediamine)],
[Zn(DPM)$_2$(N-(n-propyl)ethylenediamine)$_2$],
[Zn(DPM)$_2$(N,N-dimethylethylenediamine)],
[Zn(DPM)$_2$(N,N-dimethylethylenediamine)$_2$],
[Zn(DPM)$_2$(N,N'-dimethylethylenediamine)],
[Zn(DPM)$_2$(N,N'-dimethylethylenediamine)$_2$],
[Zn(DPM)$_2$(N,N,N'-trimethylethylenediamine)],
[Zn(DPM)$_2$(N,N,N'-trimethylethylenediamine)$_2$],
[Zn(DPM)$_2$(N,N'-diisopropylethylenediamine)],
[Zn(DPM)$_2$(N,N'-diisopropylethylenediamine)$_2$],
[Zn(DPM)$_2$(N,N-diethylethylenediamine)],
[Zn(DPM)$_2$(N,N-diethylethylenediamine)$_2$],
[Zn(DPM)$_2$(N-methylbutylamine)],
[Zn(DPM)$_2$(N-methylbutylamine)$_2$],
[Zn(DPM)$_2$(N-dibutylamine)],
[Zn(DPM)$_2$(N-dibutylamine)$_2$],
[Zn(DPM)$_2$ (n-propylamine)],
[Zn(DPM)$_2$ (n-propylamine)$_2$],
[Zn(DPM)$_2$ (n-hexylamine)],
[Zn(DPM)$_2$ (n-hexylamine)$_2$],
[Zn(DPM)$_2$ (n-heptylamine)],
[Zn(DPM)$_2$ (n-heptylamine)$_2$],
[Zn(DPM)$_2$ (n-octylamine)],
[Zn(DPM)$_2$ (n-octylamine)$_2$],
[Zn(DPM)$_2$ (n-nonylamine)],
[Zn(DPM)$_2$ (n-nonylamine)$_2$],
[Zn(DPM)$_2$ (n-decylamine)],
[Zn(DPM)$_2$ (n-decylamine)$_2$],
[Zn(DPM)$_2$ (n-dodecylamine)],
[Zn(DPM)$_2$ (n-dodecylamine)$_2$],
[Zn(DPM)$_2$(N,N-dimethyl-N-butylamine)],
[Zn(DPM)$_2$(N,N-dimethyl-N-butylamine)$_2$],
[Zn(DPM)$_2$(N-ethyl-N-butylamine)],
[Zn(DPM)$_2$(N-ethyl-N-butylamine)$_2$],
[Zn(DPM)$_2$(N,N-diisopropylamine)],
[Zn(DPM)$_2$(N,N-diisopropylamine)$_2$],
[Zn(DPM)$_2$(N,N-dipropylamine)],
[Zn(DPM)$_2$(N,N-dipropylamine)$_2$],
[Zn(acac)$_2$(N,(n-propyl)ethylenediamine)],
[Zn(acac)$_2$(N,(n-propyl)ethylenediamine)$_2$],
[Zn(acac)$_2$(N,N'-dimethylethylenediamine)],
[Zn(acac)$_2$(N,N'-dimethylethylenediamine)$_2$],
[Zn(acac)$_2$(N,N,N'-trimethylethylenediamine)],
[Zn(acac)$_2$(N,N,N'-trimethylethylenediamine)$_2$],
[Zn(acac)$_2$(N,N'-diisopropylethylenediamine)],
[Zn(acac)$_2$(N,N'-diisopropylethylenediamine)$_2$],
[Zn(acac)$_2$(N,N-diethylethylenediamine)],

[Zn(acac)₂(N,N-diethylethylenediamine)₂],
[Zn(acac)₂(N-methylbutylamine)],
[Zn(acac)₂(N-methylbutylamine)₂],
[Zn(acac)₂(N-dibutylamine)],
[Zn(acac)₂ (n-propylamine)],
[Zn(acac)₂ (n-propylamine)₂],
[Zn(acac)₂ (n-hexylamine)],
[Zn(acac)₂ (n-hexylamine)₂],
[Zn(acac)₂ (n-heptylamine)],
[Zn(acac)₂ (n-heptylamine)₂],
[Zn(acac)₂ (n-octylamine)],
[Zn(acac)₂ (n-octylamine)₂],
[Zn(acac)₂ (n-nonylamine)],
[Zn(acac)₂ (n-nonylamine)₂],
[Zn(acac)₂ (n-decylamine)],
[Zn(acac)₂ (n-decylamine)₂],
[Zn(acac)₂ (n-dodecylamine)],
[Zn(acac)₂ (n-dodecylamine)₂],
[Zn(acac)₂(N,N-dimethyl-N-butylamine)],
[Zn(acac)₂(N,N-dimethyl-N-butylamine)₂],
[Zn(acac)₂(N-ethyl-N-butylamine)],
[Zn(acac)₂(N-ethyl-N-butylamine)₂],
[Zn(acac)₂(N,N-diisopropylamine)],
[Zn(acac)₂(N,N-diisopropylamine)₂],
[Zn(acac)₂(N,N-dipropylamine)],
[Zn(acac)₂(N,N-dipropylamine)₂,
[Zn(UDD)₂(N,(n-propyl)ethylenediamine)],
[Zn(UDD)₂(N,(n-propyl)ethylenediamine)₂],
[Zn(UDD)₂(N,N-dimethylethylenediamine)],
[Zn(UDD)₂(N,N-dimethylethylenediamine)₂],
[Zn(UDD)₂(N,N'-dimethylethylenediamine)],
[Zn(UDD)₂(N,N'-dimethylethylenediamine)₂],
[Zn(UDD)₂(N,N,N'-trimethylethylenediamine)],
[Zn(UDD)₂(N,N,N'-trimethylethylenediamine)₂],
[Zn(UDD)₂(N,N'-diisopropylethylenediamine)],
[Zn(UDD)₂(N,N'-diisopropylethylenediamine)₂],
[Zn(UDD)₂(N,N-diethyl ethylenediamine)],
[Zn(UDD)₂(N,N-diethylethylenediamine)₂],
[Zn(UDD)₂(N-methylbutylamine)],
[Zn(UDD)₂(N-methylbutylamine)₂],
[Zn(UDD)₂(N-dibutylamine)],
[Zn(UDD)₂(N-dibutylamine)₂],
[Zn(UDD)₂ (n-propylamine)],
[Zn(UDD)₂ (n-propylamine)₂],
[Zn(UDD)₂ (n-hexylamine)],
[Zn(UDD)₂ (n-hexylamine)₂],
[Zn(UDD)₂ (n-heptylamine)],
[Zn(UDD)₂ (n-heptylamine)₂],
[Zn(UDD)₂ (n-octylamine)],
[Zn(UDD)₂ (n-octylamine)₂],
[Zn(UDD)₂ (n-nonylamine)],
[Zn(UDD)₂ (n-nonylamine)₂],
[Zn(UDD)₂ (n-decylamine)],
[Zn(UDD)₂ (n-decylamine)₂],
[Zn(UDD)₂ (n-dodecylamine)],
[Zn(UDD)₂ (n-dodecylamine)₂],
[Zn(UDD)₂(N,N-dimethyl-N-butylamine)],
[Zn(UDD)₂(N,N-dimethyl-N-butylamine)₂],
[Zn(UDD)₂(N-ethyl-N-butylamine)],
[Zn(UDD)₂(N-ethyl-N-butylamine)₂],
[Zn(UDD)₂(N,N-diisopropylamine)],
[Zn(UDD)₂(N,N-diisopropylamine)₂],
[Zn(UDD)₂(N,N-dipropylamine)],
[Zn(UDD)₂(N,N-dipropylamine)₂], and
with the ligand R50 being a compound of formula (7) below:

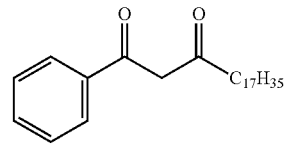

(7)

with the ligand acac being=2,4-pentanedione
with the ligand UDD being=2,4-undecanedione
with the ligand DPM being=2,2,6,6-tetramethyl-3,5-heptanedione
and with the ligand TMOD being=2,2,7-trimethyl-3,5-octanedione of formula (8) below:

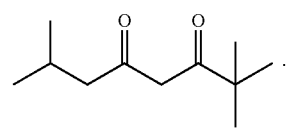

(8)

20. A complex having the following formula: [Zn(acac)₂(N-dibutylamine)].

21. An elastomer obtained by curing a composition in the presence of water or of atmospheric moisture, wherein said composition comprises:
at least one organosilicon compound A comprising at least two identical or different hydrolyzable and condensable groups, or at least two silanol functions ≡SiOH,
at least one crosslinking agent B,
optionally at least one filler C, and
a catalytically effective amount of at least one polycondensation catalyst M which is a zinc complex comprising in its structure a first type of ligand that is a β-diketonate and a second type of ligand that is an amine.

* * * * *